United States Patent
Wu et al.

(10) Patent No.: US 12,191,953 B2
(45) Date of Patent: Jan. 7, 2025

(54) CONFIGURATIONS FOR OMITTING CHANNEL STATE INFORMATION

(71) Applicant: Qualcomm Incorporated, San Diego, CA (US)

(72) Inventors: Liangming Wu, Beijing (CN); Chenxi Hao, Beijing (CN); Yu Zhang, San Diego, CA (US); Qiaoyu Li, Beijing (CN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/763,241

(22) PCT Filed: Sep. 27, 2019

(86) PCT No.: PCT/CN2019/108357
§ 371 (c)(1),
(2) Date: Mar. 24, 2022

(87) PCT Pub. No.: WO2021/056376
PCT Pub. Date: Apr. 1, 2021

(65) Prior Publication Data
US 2022/0352949 A1  Nov. 3, 2022

(51) Int. Cl.
H04W 24/10 (2009.01)
H04B 7/06 (2006.01)
H04B 17/318 (2015.01)

(52) U.S. Cl.
CPC ......... *H04B 7/0626* (2013.01); *H04B 7/0632* (2013.01); *H04B 7/0639* (2013.01); *H04B 17/318* (2015.01)

(58) Field of Classification Search
None
See application file for complete search history.

(56) References Cited

U.S. PATENT DOCUMENTS

2019/0109626 A1  4/2019  Park et al.
2019/0199420 A1  6/2019  Faxér et al.
(Continued)

FOREIGN PATENT DOCUMENTS

CN   108933648 A   12/2018
CN   110138527 A   8/2019
(Continued)

OTHER PUBLICATIONS

Ericsson: "On CSI Enhancements for MU-MIMO", 3GPP Draft, 3GPP TSG RAN WG1 Meeting RAN1#97, R1-1907074, On CSI Enhancements for MU-MIMO, 3rd Generation Partnership Project (3GPP), Mobile Competence Centre, 650 Route Des Lucioles, F-06921 Sophia-Antipolis Cedex, France, vol. RAN WG1, No. Reno, US, May 13, 2019-May 17, 2019, May 13, 2019 (May 13, 2019), XP051728520, 19 Pages, Retrieved from the Internet: URL:http://www.3gpp.org/ftp/Meetings%5F3GPP%5FSYNC/RAN1/Docs/R1%2D1907074%2Ezip [retrieved on May 13, 2019] section 1-3.
(Continued)

*Primary Examiner* — Anez C Ebrahim
(74) *Attorney, Agent, or Firm* — Paul M. McAdams; Holland & Hart LLP

(57) ABSTRACT

Methods, systems, and devices for wireless communications are described. A user equipment (UE) may determine to use one or more channel state information (CSI) omission configurations for omitting portions of a CSI report. For example, a UE may receive a trigger to report CSI, and the UE may identify that a payload of the CSI report exceeds a capacity of resources for transmitting the report. As such, the UE may determine to use one or more CSI omission configurations, where each CSI omission configuration may correspond to dropping different portions of the CSI report. The selection of the CSI omission configuration to use may be based on a set of parameters associated with CSI report-
(Continued)

ing. In some cases, the UE selects the CSI omission configuration based on an explicit indication from the base station. Additionally or alternatively, the UE may implicitly determine the CSI omission configuration based on the parameters.

31 Claims, 17 Drawing Sheets

(56) References Cited

U.S. PATENT DOCUMENTS

| | | | |
|---|---|---|---|
| 2019/0215130 | A1 | 7/2019 | Aiba et al. |
| 2019/0319682 | A1* | 10/2019 | Zhang ................ H04B 7/0626 |
| 2020/0295812 | A1 | 9/2020 | Rahman et al. |
| 2021/0409991 | A1* | 12/2021 | Park ..................... H04L 5/0057 |

FOREIGN PATENT DOCUMENTS

| | | |
|---|---|---|
| CN | 110167062 A | 8/2019 |
| WO | WO-2019071383 A1 | 4/2019 |
| WO | WO-2019144270 A1 | 8/2019 |

OTHER PUBLICATIONS

Ericsson: "On CSI Enhancements for MU-MIMO," 3GPP TSG RAN WG1 Meeting RAN1#98, Aug. 26, 2019-Aug. 30, 2019, R1-1909523, Sep. 4, 2019 (Sep. 4, 2019), sections 1-5, 28 pages.
Ericsson: "On CSI Omission Procedure," 3GPP TSG RAN WG1 Meeting RAN1#97, May 13, 2019-May 17, 2019, R1-1907076, May 3, 2019 (May 3, 2019), sections 1-4, pp. 1-6.
International Search Report and Written Opinion—PCT/CN2019/108357—ISA/EPO—May 23, 2020.
Supplementary European Search Report—EP19947091—Search Authority—Munich—Apr. 4, 2023.

* cited by examiner

CONFIGURATIONS FOR OMITTING CHANNEL STATE INFORMATION

CROSS REFERENCE

The present Application is a 371 national stage filing of International PCT Application No. PCT/CN2019/108357 by Wu et al., entitled "CONFIGURATIONS FOR OMITTING CHANNEL STATE INFORMATION," filed Sep. 27, 2019, which is assigned to the assignee hereof, and which is expressly incorporated by reference in its entirety herein.

FIELD OF TECHNOLOGY

The following relates generally to wireless communications and more specifically to configurations for omitting channel state information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configurations for omitting channel state information (CSI). Generally, the described techniques provide for the selection of a CSI omission scheme that a UE uses for omitting various portions of a CSI report. For example, a UE may receive a trigger to report CSI to a base station, and the UE may accordingly identify a payload of the corresponding CSI report. Additionally, the UE may identify a set of resources (e.g., physical uplink shared channel (PUSCH) resources) allocated for the transmission of the CSI report. In some cases, the payload of the CSI report may exceed the capacity of the allocated resources, and the UE may determine to omit or drop at least a portion of the CSI report. As such, the UE may determine one or more CSI omission configurations, where each CSI omission configuration of the one or more CSI omission configurations may correspond to dropping different portions of the CSI report. The selection of the CSI omission configuration may be based on a set of parameters associated with CSI reporting, where the parameters may include a number of frequency domain (FD) bases, a number of spatial domain (SD) bases, a number of non-zero coefficients (NNZCs), or the like. In one example, the UE may select the CSI omission configuration to use based on an explicit indication of the CSI omission configuration received from the base station. In other examples, the UE may implicitly determine the CSI omission configuration to use based on the CSI reporting parameters indicated by the base station. Upon selecting a CSI omission configuration, the UE may generate and transmit a CSI report to the base station (e.g., excluding portions of the report in accordance with the selected CSI omission configuration).

A method of wireless communication at a UE is described. The method may include receiving, from a base station, a trigger for a CSI report, identifying a payload for the CSI report and uplink resources for transmitting the CSI report based on the trigger, identifying one or more CSI reporting parameters associated with generating the CSI report, the one or more CSI reporting parameters including a number of FD bases, a number of SD bases, NNZCs, or any combination thereof, determining to use one or more CSI omission configurations to omit a portion of the CSI report, where the determination is based on the one or more CSI reporting parameters, the payload, and the uplink resources, and transmitting, to the base station, the CSI report that excludes the omitted portion based on the determination.

An apparatus for wireless communication at a UE is described. The apparatus may include a processor, memory coupled with the processor, and instructions stored in the memory. The instructions may be executable by the processor to cause the apparatus to receive, from a base station, a trigger for a CSI report, identify a payload for the CSI report and uplink resources for transmitting the CSI report based on the trigger, identify one or more CSI reporting parameters associated with generating the CSI report, the one or more CSI reporting parameters including a number of FD bases, a number of SD bases, NNZCs, or any combination thereof, determine to use one or more CSI omission configurations to omit a portion of the CSI report, where the determination is based on the one or more CSI reporting parameters, the payload, and the uplink resources, and transmit, to the base station, the CSI report that excludes the omitted portion based on the determination.

Another apparatus for wireless communication at a UE is described. The apparatus may include means for receiving, from a base station, a trigger for a CSI report, identifying a payload for the CSI report and uplink resources for transmitting the CSI report based on the trigger, identifying one or more CSI reporting parameters associated with generating the CSI report, the one or more CSI reporting parameters including a number of FD bases, a number of SD bases, NNZCs, or any combination thereof, determining to use one or more CSI omission configurations to omit a portion of the CSI report, where the determination is based on the one or more CSI reporting parameters, the payload, and the uplink resources, and transmitting, to the base station, the CSI report that excludes the omitted portion based on the determination.

A non-transitory computer-readable medium storing code for wireless communication at a UE is described. The code may include instructions executable by a processor to receive, from a base station, a trigger for a CSI report, identify a payload for the CSI report and uplink resources for transmitting the CSI report based on the trigger, identify one or more CSI reporting parameters associated with generating the CSI report, the one or more CSI reporting parameters including a number of FD bases, a number of SD bases, NNZCs, or any combination thereof, determine to use one or more CSI omission configurations to omit a portion of the CSI report, where the determination is based on the one or more CSI reporting parameters, the payload, and the uplink resources, and transmit, to the base station, the CSI report that excludes the omitted portion based on the determination.

Some examples of the method, apparatuses, and non-transitory computer-readable medium described herein may further include operations, features, means, or instructions for receiving, from the base station, an indication to use one of the one or more CSI omission configurations, and determining to use the one of the one or more CSI omission configurations based on the received indication.

In some examples of the method, apparatuses, and non-transitory computer-readable medium described herein, receiving the indication may include operations, features, means, or instructions for receiving the indication via radio resource control signaling.

In some examples of the method, apparatuses, and non-transitory computer-readable medium described herein, the indication may be based on the one or more CSI reporting parameters.

Some examples of the method, apparatuses, and non-transitory computer-readable medium described herein may further include operations, features, means, or instructions for identifying a configuration of a table associated with the one or more CSI reporting parameters, and determining to use one of the one or more CSI omission configurations based on the configuration of the table.

Some examples of the method, apparatuses, and non-transitory computer-readable medium described herein may further include operations, features, means, or instructions for identifying respective values of the one or more CSI reporting parameters, and determining to use one of the one or more CSI omission configurations based on one or more of the respective values satisfying a threshold.

Some examples of the method, apparatuses, and non-transitory computer-readable medium described herein may further include operations, features, means, or instructions for identifying that a number of coefficients for the CSI report satisfies a threshold based on the one or more CSI reporting parameters, and determining to use one of the one or more CSI omission configurations based on the number of coefficients satisfying the threshold.

Some examples of the method, apparatuses, and non-transitory computer-readable medium described herein may further include operations, features, means, or instructions for determining channel quality indicator (CQI) information for the CSI report based on precoding matrix indicator information, refraining from updating the determined CQI information after omitting the portion of the CSI report, where the omitted portion of the CSI report includes at least a portion of the precoding matrix indicator information, and including the determined CQI information in the CSI report.

In some examples of the method, apparatuses, and non-transitory computer-readable medium described herein, a first CSI omission configuration of the one or more CSI omission configurations corresponds to the CSI report including at a first portion of the NNZCs and dropping a second portion of the NNZCs, where the first portion of the NNZCs and the second portion of the NNZCs may be each based on an SD basis, an FD basis, one or more layers, a strength metric, or any combination thereof.

In some examples of the method, apparatuses, and non-transitory computer-readable medium described herein, a second CSI omission configuration of the one or more CSI omission configurations corresponds to the CSI report including a first portion of the NNZCs and a first bitmap corresponding to a first portion of the NNZCs and dropping a second portion of the NNZCs and a second bitmap corresponding to a second portion of the NNZCs, where the first portion of the NNZCs and the second portion of the NNZCs may be each based on an SD basis, an FD basis, one or more layers, a strength metric, or any combination thereof.

In some examples of the method, apparatuses, and non-transitory computer-readable medium described herein, the first bitmap includes a first number of bits that may be based on a rank indicator, a set of NNZCs for each layer of one or more layers, and the first portion of the NNZCs, and where the second bitmap includes a second number of bits corresponding to the second portion of the NNZCs.

In some examples of the method, apparatuses, and non-transitory computer-readable medium described herein, the first bitmap includes a first number of bits that may be based on a first portion of the SD basis, a first portion of the FD basis, a polarization metric, a first portion of the one or more layers, the strength metric, or any combination thereof, and where the second bitmap includes a second number of bits that may be based on a second portion of the SD basis, a second portion of the FD basis, the polarization metric, a second portion of the one or more layers, the strength metric, or any combination thereof.

In some examples of the method, apparatuses, and non-transitory computer-readable medium described herein, the CSI report includes a Type II CSI report.

A method of wireless communication at a base station is described. The method may include configuring one or more CSI reporting parameters for a CSI report, the one or more CSI reporting parameters including a number of FD bases, a number of SD bases, NNZCs, or any combination thereof, transmitting, to a UE, an indication to use one of one or more CSI omission configurations for omitting a portion of the CSI report, transmitting, to the UE, a trigger for the CSI report that is based on the configured one or more CSI reporting parameters, and receiving, from the UE, the CSI report that omits a portion of the CSI report in accordance with the one of the one or more CSI omission configurations based on the indication.

An apparatus for wireless communication at a base station is described. The apparatus may include a processor, memory coupled with the processor, and instructions stored in the memory. The instructions may be executable by the processor to cause the apparatus to configure one or more CSI reporting parameters for a CSI report, the one or more CSI reporting parameters including a number of FD bases, a number of SD bases, NNZCs, or any combination thereof, transmit, to a UE, an indication to use one of one or more CSI omission configurations for omitting a portion of the CSI report, transmit, to the UE, a trigger for the CSI report that is based on the configured one or more CSI reporting parameters, and receive, from the UE, the CSI report that omits a portion of the CSI report in accordance with the one of the one or more CSI omission configurations based on the indication.

Another apparatus for wireless communication at a base station is described. The apparatus may include means for configuring one or more CSI reporting parameters for a CSI report, the one or more CSI reporting parameters including a number of FD bases, a number of SD bases, NNZCs, or any combination thereof, transmitting, to a UE, an indication to use one of one or more CSI omission configurations for omitting a portion of the CSI report, transmitting, to the UE, a trigger for the CSI report that is based on the configured one or more CSI reporting parameters, and receiving, from the UE, the CSI report that omits a portion of the CSI report in accordance with the one of the one or more CSI omission configurations based on the indication.

A non-transitory computer-readable medium storing code for wireless communication at a base station is described. The code may include instructions executable by a processor to configure one or more CSI reporting parameters for a CSI report, the one or more CSI reporting parameters including a number of FD bases, a number of SD bases, NNZCs, or any combination thereof, transmit, to a UE, an indication to use one of one or more CSI omission configurations for omitting a portion of the CSI report, transmit, to the UE, a trigger for the CSI report that is based on the configured one or more CSI reporting parameters, and receive, from the UE, the CSI report that omits a portion of the CSI report in accordance with the one of the one or more CSI omission configurations based on the indication.

In some examples of the method, apparatuses, and non-transitory computer-readable medium described herein, transmitting the indication may include operations, features, means, or instructions for transmitting the indication via radio resource control signaling.

In some examples of the method, apparatuses, and non-transitory computer-readable medium described herein, a first CSI omission configuration of the one or more CSI omission configurations corresponds to the CSI report including at least a first portion of the NNZCs and excluding a second portion of the NNZCs, where the first portion of the NNZCs and the second portion of the NNZCs may be each based on an SD basis, an FD basis, one or more layers, a strength metric, or any combination thereof.

In some examples of the method, apparatuses, and non-transitory computer-readable medium described herein, a second CSI omission configuration of the one or more CSI omission configurations corresponds to the CSI report including a first portion of the NNZCs and a first bitmap corresponding to the first portion of the NNZCs and dropping a second portion of the NNZCs and a second bitmap corresponding to the second portion of the NNZCs, where the first portion of the NNZCs and the second portion of the NNZCs may be each based on an SD basis, an FD basis, one or more layers, a strength metric, or any combination thereof.

In some examples of the method, apparatuses, and non-transitory computer-readable medium described herein, the first bitmap includes a first number of bits that may be based on a rank indicator, a set of NNZCs for each layer of one or more layers, and the first portion of the NNZCs, and where the second bitmap includes a second number of bits corresponding to the second portion of the NNZCs.

In some examples of the method, apparatuses, and non-transitory computer-readable medium described herein, the first bitmap includes a first number of bits that may be based on a first portion of the SD basis, a first portion of the FD basis, a polarization metric, a first portion of the one or more layers, the strength metric, or any combination thereof, and where the second bitmap includes a second number of bits that may be based on a second portion of the SD basis, a second portion of the FD basis, the polarization metric, a second portion of the one or more layers, the strength metric, or any combination thereof.

In some examples of the method, apparatuses, and non-transitory computer-readable medium described herein, the CSI report includes a Type II CSI report.

DETAILED DESCRIPTION

Figure 1:
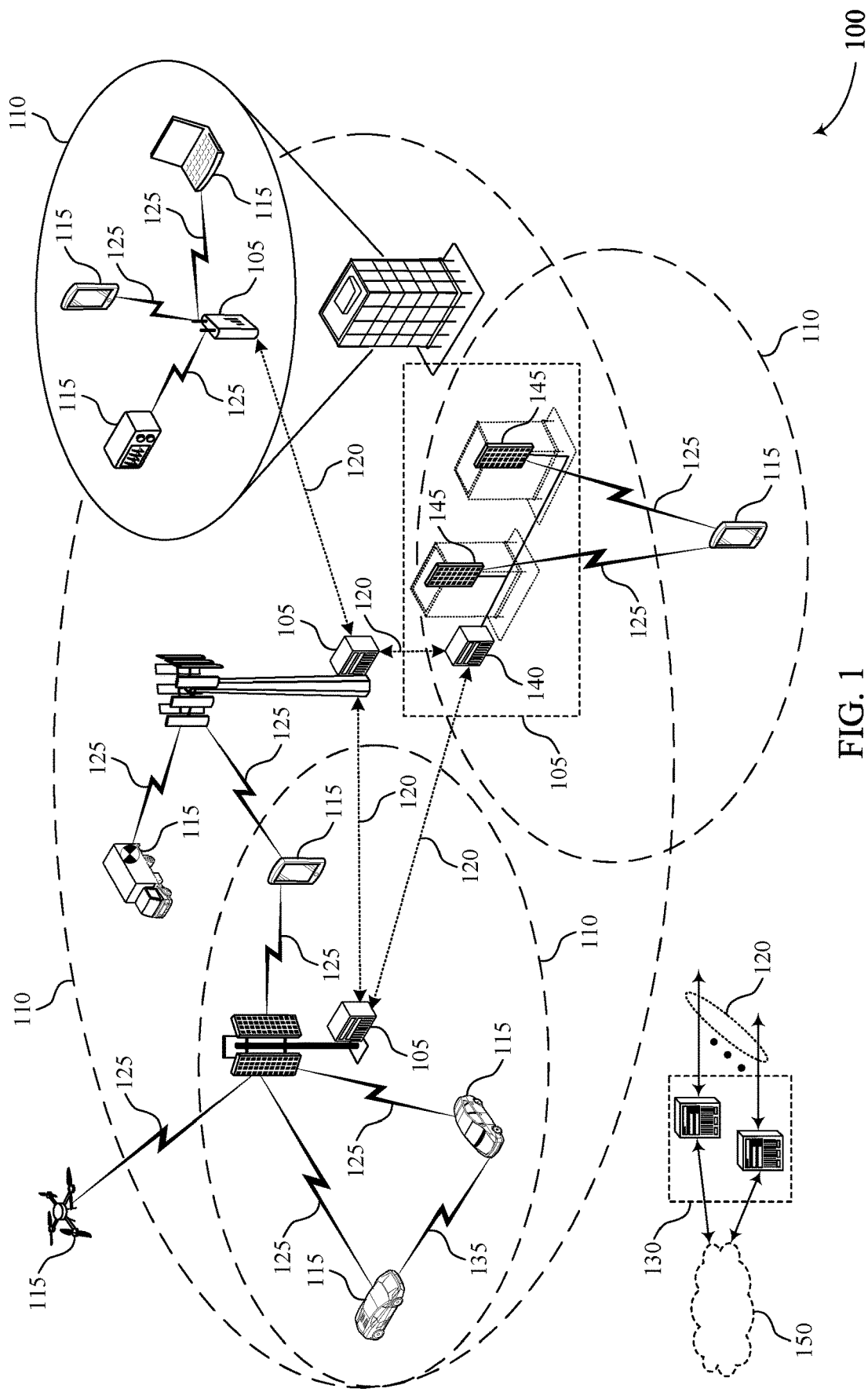
FIG. 1 illustrates an example of a system for wireless communications that supports configurations for omitting channel state information (CSI) in accordance with aspects of the present disclosure.

A user equipment (UE) may transmit a channel state information (CSI) report (e.g., a Type II CSI feedback report) to enable a base station to identify a quality and other metrics of a channel for scheduling or performing subsequent communications. For instance, a CSI report may indicate properties of a communication link between the UE and base station, where the CSI report may be based on the receipt of one or more reference signals (e.g., CSI reference signals (CSI-RSs)). In such cases, the UE may receive one or more CSI-RSs and may also receive a trigger to report CSI (e.g., via downlink control information (DCI)) based on the received CSI-RSs. The UE may be allocated some resources for transmitting the CSI report to the base station. In some cases, however, a payload of the CSI report may exceed the capability of the resources used to carry the report. For instance, the CSI payload may exceed an allowed number of allocated physical uplink shared channel (PUSCH) resources a UE is to use for transmitting a CSI report. In such cases, some portions of the CSI payload may be omitted from the report.

In some examples, CSI omission by a UE may follow one or more CSI omission configurations. For instance, a first omission configuration may include dividing a total number of beam coefficients (e.g., non-zero coefficients (NZCs)) into two groups and dropping the coefficients in the second group (which may be done by de-prioritizing the coefficients for the corresponding group). A second omission configuration may include dropping the beam coefficients of the second group and also dropping corresponding bits (e.g., from a corresponding bitmap of the coefficients) or frequency domain (FD) basis or spatial domain (SD) information. The UE may transmit the CSI report (e.g., with a reduced payload) that omits the portions of the report in accordance with the first or second omission configuration. These CSI omission configurations may provide various benefits for CSI reporting (e.g., the first omission configuration may provide lower complexity and the second omission configuration may provide greater overhead savings), and the UE may be capable of selecting or switching between different CSI omission configurations.

CSI omission may be determined based on the configuration of CSI reporting parameters, and the particular CSI omission configuration (which may also be referred to as a CSI omission scheme, CSI omission rules, or other like terminology) to be used may be indicated explicitly or determined implicitly. For example, a base station may explicitly configure the CSI omission configuration to be used when a UE omits a portion of a CSI report. In such cases, the base station may provide an indication of the omission configuration to a UE prior to triggering a CSI report, and the UE may use the indicated configuration if/when omitting portions of the CSI report. Additionally or alternatively, the omission configuration to be used may be implicitly indicated based on the CSI reporting parameters configured by the network. For instance, the reporting parameters may indicate a large number of beam coefficients to be reported, and the use of the second omission configuration may be implicit (e.g., due to the overhead savings benefits provided by the second configuration). In other cases, some values of the parameters or the configuration of a CSI parameter table may implicitly indicate which omission configuration to use (e.g., when respective parameters satisfy a threshold value or other conditions). In any case, the UE may determine the appropriate configuration for performing CSI omission, and the UE may transmit the reduced-payload CSI report according to the selected configuration.

Aspects of the disclosure are initially described in the context of wireless communications systems. Additionally, aspects of the disclosure are illustrated through examples of CSI omission configurations and a process flow. Aspects of the disclosure are further illustrated by and described with reference to apparatus diagrams, system diagrams, and flowcharts that relate to techniques for selecting or switching between CSI omission configurations.

FIG. 1 illustrates an example of a wireless communications system 100 that supports configurations for omitting CSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

A base station 105 may gather channel condition information from a UE 115 in order to efficiently configure schedule the channel. This information may be sent from the UE 115 in the form of a channel state report (or CSI report). A channel state report may contain a rank indicator (RI) requesting a number of layers to be used for downlink transmissions (e.g., based on antenna ports of the UE 115), a precoding matric indicator (PMI) indicating a preference for which precoder matrix should be used (e.g., based on a number of layers), and a channel quality indicator (CQI) representing a highest modulation and coding scheme (MCS) that may be used. CQI may be calculated by a UE 115 after receiving predetermined pilot symbols such as cell-specific reference signals (CRS) or CSI-RS. RI and PMI may be excluded if the UE 115 does not support spatial multiplexing (or is not in a supported spatial mode). In some examples, the types of information included in the CSI report determines a reporting type. Channel state reports may be periodic or aperiodic. Further, channel state reports may have different types based on a codebook used to generate the report. For instance, a Type I CSI report may be based on a first codebook and a Type II CSI report may be based on a second codebook, where the first and second codebooks may be based on different antenna configurations. In some cases, the use of either Type I or Type II CSI reports may improve MIMO performance (as compared to other types of CSI reports). In some cases, a Type II CSI report may be carried at least on a PUSCH, and may provide CSI to a base station 105 with a relatively higher level of granularity (e.g., for MU-MIMO services).

A UE may transmit CSI reports to a base station to indicate various properties of a communication link. In some examples, a payload of a CSI report may exceed the capability of the resources for carrying the report, and some portions of the CSI payload may be omitted from the report as a result. In some cases, techniques may be desirable to enable the selection of, or switching between, various CSI omission configurations.

In some examples, and as described herein, a UE 115 may omit portions of a CSI report (e.g., a Type II CSI report) in cases where a payload of the CSI report exceeds the capacity of the resources (e.g., PUSCH time/frequency resources) used to carry the CSI report. The UE 115 may identify different portions of the CSI report to omit based, at least in part, on a CSI omission scheme or configuration. For instance, the UE 115 may determine the CSI omission configuration based on a number of parameters (such as an SD basis, an FD basis, a maximum number of NNZCs, or the like). Additionally, the selection of a particular CSI omission configuration may be implicitly indicated (e.g., by the base station 105 via radio resource control (RRC) signaling) or may be implicit based on the parameters.

That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. Wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support the selection of CSI omission schemes that a UE 115 uses for omitting various portions of a CSI report. For example, a UE 115 may receive a trigger to report CSI to a base station 105, and the UE 115 may accordingly identify a payload of the corresponding CSI report. Additionally, the UE 115 may identify a set of resources (e.g., PUSCH resources) allocated for the transmission of the CSI report, however, in some cases, the payload of the CSI report may exceed the capacity of the allocated resources, and it may be determined to omit or drop at least a portion of the CSI report. As such, the UE 115 may determine one or more CSI omission configurations to use for reducing the payload of the CSI report, where each CSI omission configuration of the one or more CSI omission configurations may correspond to dropping different portions of the CSI report. As an example, a first CSI omission configuration may configure respective groups of coefficients (e.g., NZCs) and a UE 115 may drop a portion of the coefficients based on the grouping (e.g., drop one of the NZC groups). In another example, a second CSI omission configuration may configure the groups of the coefficients and also group sets of bits that correspond to the coefficients (e.g., in a bitmap for the NZCs). Using this configuration, the UE 115 may drop one of the coefficient groups as well as one of the bitmap groups based on the second CSI omission configuration. Other configurations for dropping portions of a CSI report may be used.

Selection of the CSI omission configuration may be based on a set of parameters associated with CSI reporting, where the parameters may include a number of FD bases, a number of SD bases, a maximum NNZCs, or the like. The UE 115 may select the CSI omission configuration to use based on an explicit indication of the CSI omission configuration received from the base station 105 (e.g., via a configuration indicated through RRC signaling (e.g., an RRC information element)). In other examples, the UE 115 may implicitly determine the CSI omission configuration to use based on the CSI reporting parameters indicated by the base station 105. Upon selecting a CSI omission configuration, the UE 115 may generate and transmit a CSI report to the base station 105 (e.g., excluding portions of the report in accordance with the selected CSI omission configuration).

Figure 2:
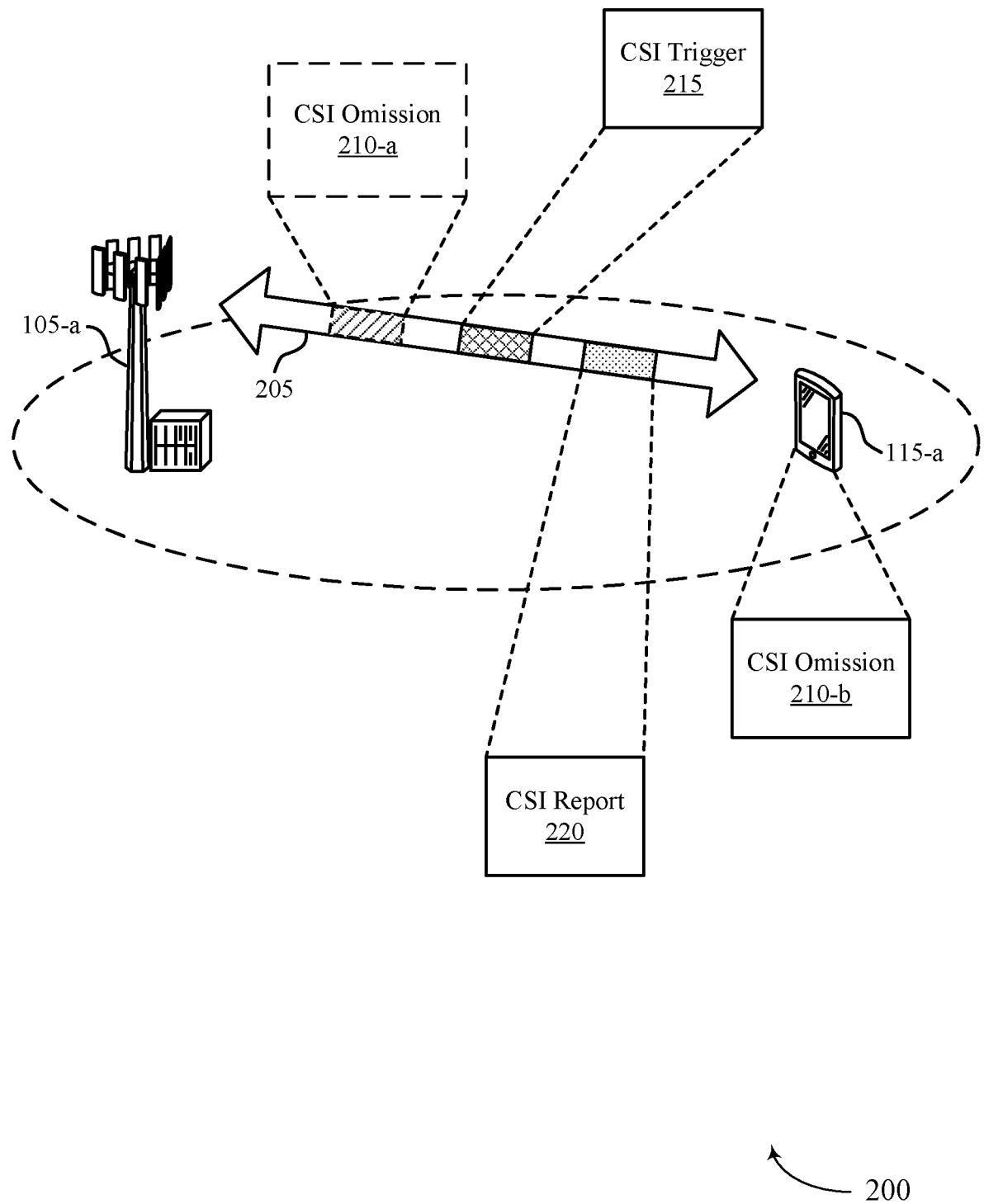
FIG. 2 illustrates an example of a wireless communications system that supports configurations for omitting CSI in accordance with aspects of the present disclosure.

FIG. 2 illustrates an example of a wireless communications system 200 that supports configurations for omitting CSI in accordance with aspects of the present disclosure. In some examples, wireless communications system 200 may implement aspects of wireless communications system 100. Wireless communications system 200 includes a base station 105-a and a UE 115-a, which may be examples of corresponding base stations 105 and UEs 115, respectively, as described with reference to FIG. 1. Wireless communications system 200 may illustrate various techniques for indicating one or more CSI omission configurations for omitting portions of a CSI report.

In some cases, UE 115-a and base station 105-a may communicate on resources of a communication link 205 (e.g., a channel, a beam, etc.). For instance, the communications on communication link 205 may be performed via beamformed transmissions, as described herein with reference to FIG. 1.

UE 115-a may transmit to base station 105-a CSI report 220 to enable base station 105-a to identify a quality of a channel for scheduling or performing subsequent communications. In some cases, the payload of CSI report 220 may exceed the allowed number of allocated PUSCH resources UE 115-a is to use for transmitting CSI report 220. In such cases, UE 115-a may determine to omit some portions of the CSI payload in CSI report 220 using one or more CSI omission configurations.

In some aspects, a first CSI omission configuration may include dividing a total number of beam coefficients (e.g., non-zero coefficients (NZCs)) into groups (e.g., two groups) and dropping the NZCs in a second group. A second CSI omission configuration may include dropping the beam coefficients of the second group and also dropping bits from the corresponding bitmap of the coefficients, frequency domain (FD), spatial domain (SD) basis information. UE 115-a may omit portions of the CSI payload using the first or second CSI omission configuration and transmit the updated CSI report 220 to base station 105-a. The CSI omission configurations may be explicitly indicated (e.g., configured by base station 105-a and sent to UE 115-a) or implicitly indicated (e.g., based on the CSI reporting parameters configured by the network). The different configurations used for omitting CSI may each have different benefits. For instance, the first CSI omission configuration may provide for a level of computational simplicity for UE 115-a, resulting in a low-complexity scheme for omitting part of a CSI. The second CSI omission configuration may provide for improved overhead savings (e.g., as compared to the first CSI omission configuration), where the second CSI omission configuration may be used in cases where overhead savings may improve communications efficiency (such as when a relatively large number of beam coefficients may be reported). It is noted that other CSI omission configurations may be used, even if not explicitly mentioned herein. As such, UE 115-a may use one or more CSI omission configurations when omitting portions of a CSI report.

As an example of an explicit indication, base station 105-a may optionally transmit (e.g., via RRC signaling) an indication of a CSI omission configuration 210-a (e.g., a first or second omission configuration as described herein) to UE 115-a. Base station 105-a may configure CSI reporting parameters and transmit the parameters in the indication of the CSI omission configuration 210-a. The CSI reporting parameters may include a number of FD bases, a number of SD bases, NNZCs, or any combination thereof. Through the explicit indication, base station 105-a may change or modify the CSI omission configuration based on the configured parameters of CSI report 220.

Base station 105-a may send CSI trigger 215 and associated CSI-RS(s) to UE 115-a to transmit CSI report 220. UE 115-a may identify a CSI payload for CSI report 220 and uplink resources for sending CSI report 220. In some cases, UE 115-a may omit portions of CSI report 220 based on the size of the CSI payload, the available uplink resources, and/or one or more of the CSI reporting parameters. After configuring CSI report 220, UE 115-a may transmit CSI report 220, without the omitted portions, to base station 105-a. CSI report 220 may enable base station 105-a to identify information about communication link 205 for determining parameters for subsequent communications with UE 115-a (e.g., selecting a new beam, adjusting transmission power, etc.).

Additionally or alternatively, UE 115-a may identify the CSI reporting parameters configured by the network. UE 115-a may identify a configuration of a table (e.g., Table 1 as illustrated below) associated with the CSI reporting parameters and determine CSI omission configuration 210-b (e.g., the first or second omission configuration) based on the configuration of the table. The parameters of the Table 1 may include M (e.g., number of FD basis), L (e.g., number of SD basis), p, $y_0$, $v_0$, R, and $N_3$ (e.g., parameters to generate the M value), an RI value, and $\beta$ (e.g., a parameter to generate the largest NNZC). Parameters L, p, R, and $N_3$ may relate to bitmap size. 2*L*M may represent the bitmap value of NNZCs. In some examples, a large 2LM value may indicate overhead communication savings for the second CSI omission configuration.

TABLE 1

| CSI omission parameter table | | | | |
|---|---|---|---|---|
| L | p = $y_0$ (RI = 1-2) | p = $v_0$ (RI = 3-4) | $\beta$ | Restriction (if any) |
| 2 | ¼ | ⅛ | ¼ | |
| 2 | ¼ | ⅛ | ½ | |
| 4 | ¼ | ⅛ | ¼ | |
| 4 | ¼ | ⅛ | ½ | |
| 4 | ¼ | ¼ | ¾ | |
| 6 | ¼ | — | ½ | RI = 1-2, 32 ports |
| 6 | ¼ | — | ¾ | |

In some cases, PMI on $N_3$ sub-bands may be formed by the product of three matrices, which may include a wideband spatial beam matrix $W_1$ (e.g., to report L SD bases), an FD compression matrix $W_{f,l}^H$ (e.g., to report M FD bases), and a sparse coefficient matrix $W'_2{}^{(l)}$ (which may report up to $K_0$<2LM NZCs per layer and/or up to $2K_0$ NZCs across all layers for RI={2,3,4}). In some cases, L may be configured by a base station, and may include candidate values of 2, 4, and 6 (only for rank 2), whereas M may be configured in accordance with the equations $$RI = \{1, 2\}, M_{1,2} = \left\lceil \frac{N_3}{R} \times p \right\rceil; RI = \{3, 4\}, M_{3,4} = \left\lceil \frac{N_3}{R} \times v_0 \right\rceil$$

where (p, $v_0$) may be configured and may have candidate values of (p, $v_0$)=(½, ¼), (¼, ¼), (¼, ⅛). In some cases, $K_0$ may be configured by the equation $K_0 = \lceil LM_{1,2} \times \beta \blacktriangle \rceil$, where $\beta$ may be configured and may have candidate values according to $\beta$=¼, ½, ¾. In some cases, for R={1,2}, and $N_{SB}$ may be a number of CQI SBs, when $N_{SB} \times R > 13$, $N_3$ may be a smallest multiple of a set of number (e.g., 2, 3, 5 only) which may be larger than $N_{SB} \times R$. In some cases, a number of PMI SBs may be divided into multiple (e.g., two) segments. In other cases, $N_3 = N_{SB} \times R$.

In some examples, the first CSI omission configuration may be enabled until some rows of the CSI parameter table (e.g., the last two or three rows of Table 1) are configured, in which case the second CSI omission configuration may be enabled. As such, UE 115-a may identify the configuration of Table 1 and may determine whether to use the first or second CSI omission configuration based on the table's configuration (e.g., the configuration of Table 1).

Additionally or alternatively, a value of one of the parameters may indicate the CSI omission configuration to use. For instance, a particular CSI omission configuration may be used if one or more parameters satisfy a threshold. As an illustrative example, the second CSI omission configuration may be enabled over the first CSI omission configuration when R is equal to 2 or when $N_3$ (or a number of sub-bands (NSB)*R) has a greater value than 19.

In some cases, UE 115-a may identify respective values of the CSI reporting parameters, where determining to use the first or second CSI omission configurations to omit the portion of CSI report 220 is based on one or more of the respective values satisfying a threshold. In other cases, UE 115-a may identify that a number of coefficients for the CSI report (e.g., 2*L*M) satisfies a threshold based on the one or more CSI reporting parameters. UE 115-a may determine to omit the portion of CSI report 220 with the first or second CSI omission configuration based on the number of coefficients satisfying the threshold.

In some examples, UE 115-a may determine CQI information based on PMI information. However, the omitted portion of CSI report 220 may include PMI information and UE 115-a may not update the CQI information after omitting the portion of CSI report 220 (e.g., because UE 115-a may not have time or resources to update the CQI calculation). UE 115-a may report CQI information in the CSI report 220 that is calculated prior to the determination to omit portions of CSI report 220.

Figure 3:
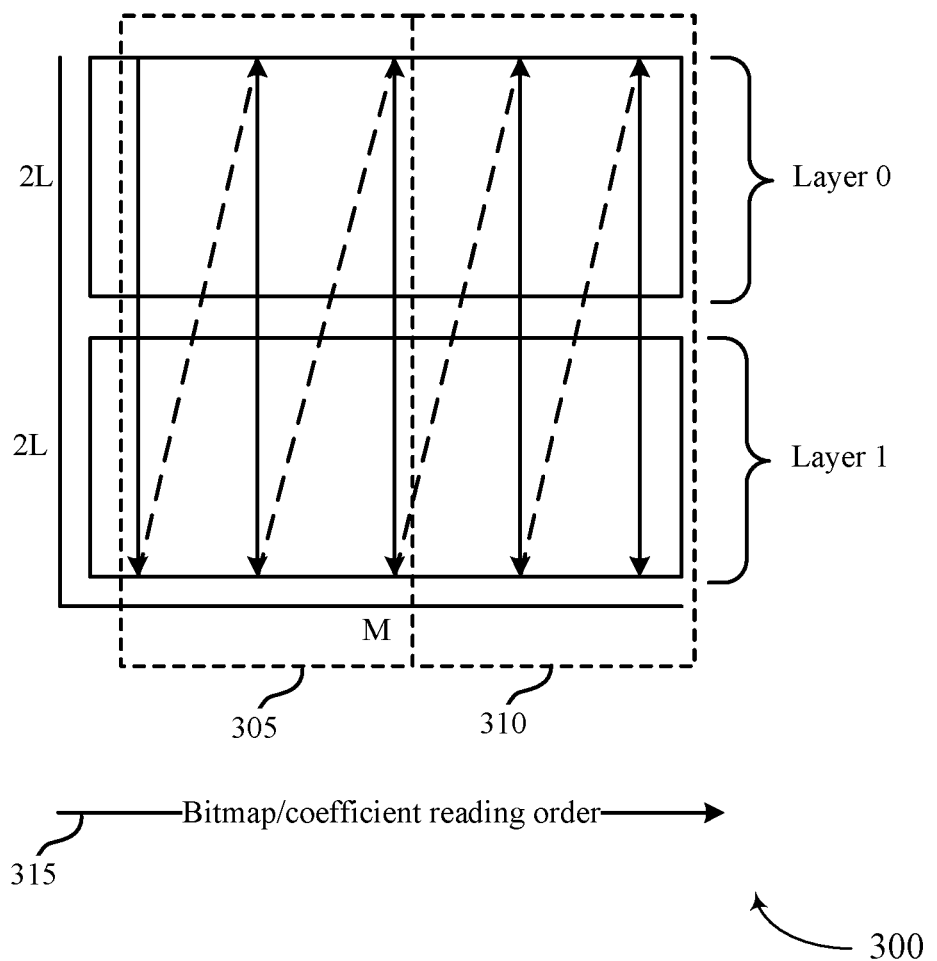
FIGS. 3 and 4 illustrate examples of CSI omission configurations and mapping orders that support configurations for omitting CSI in accordance with aspects of the present disclosure.
Figure 3:
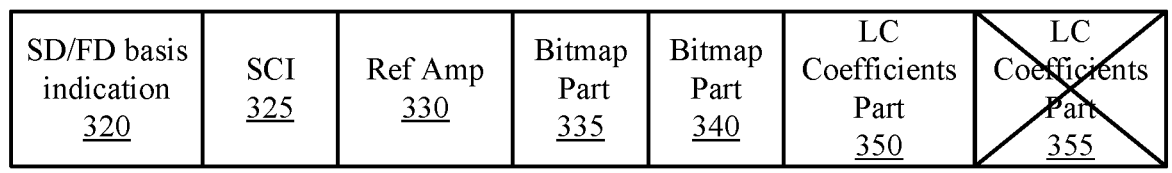

FIG. 3 illustrates an example of a CSI omission configuration 300 and a mapping order 301 that support configurations for omitting CSI in accordance with aspects of the present disclosure. In some examples, CSI omission configuration 300 may implement aspects of wireless communications systems 100 and 200. For instance, a UE 115 may use CSI omission configuration 300 and mapping order 301 when reporting CSI to a base station 105. In some cases, CSI omission configuration 300 may also be referred to as a CSI omission rule, a CSI omission scheme, or some other suitable terminology.

A UE 115 may report CSI to a base station based on various CSI reporting parameters. Additionally, the UE 115 may use the parameters to select CSI omission configuration 300. A CSI report may include at least one of an SD basis, an FD basis, an NNZC indicator indicating a total NNZCs across a set of layers, additional NNZC indicators indicating the NNZC of each layer of one or more layers of the set of layers, a set of bitmaps indicating indices of NNZC of each layer of the plurality of layers, one or more strongest coefficient indicator (SCI) of each layer of one or more layers of the set of layers, quantizations of the plurality of the NNZCs of each of the one or more layers, or any combination thereof. The relation between the NZCs and bitmaps, as illustrated, may be 2L*M bits (e.g., L may refer to the number of SD basis and M may refer to the number of FD basis) in layer 0 and layer 1. The bitmap/coefficient reading order 315 may indicate how to read and report the coefficients and bitmap. For example, if layer 0 and layer 1 each have 2L*M bits indicating the NZCs, the order of the CSI coefficients may follow the packing order of layer 0 and layer 1 as indicated by the illustrated arrows.

CSI omission configuration 300 may illustrate a configuration that omits or drops a portion of NZCs from a CSI report. For instance, a UE 115 may perform CSI omission using CSI omission configuration 300 (e.g., implicitly indicated based on the CSI reporting parameters configured by the network or explicitly indicated by a base station 105) for a CSI report. In such cases, the UE 115 may divide a total number of NZCs per layer (e.g., K) into a first NZC group 305 and second NZC group 310 (e.g., a first portion of NZCs and a second portion of NZCs). The first NZC group 305 and the second NZC group 310 may be based on the first portion (e.g., half) of the total NNZC and second portion (e.g., half) of the total NNZC. The first half and second half may be divided in terms of association of SD basis, FD basis, a polarization metric, layer, a strength metric, or the like. In some examples, the first NZC group may be represented or contain $K_{NZ}^{tot}/2$ NZCs and the second NZC group may be represented by $K_{NZ}^{tot}/2$ NZCs. In accordance with CSI omission configuration 300, the UE 115 may omit the second NZC group 310 (e.g., corresponding to a linear combination (LC) coefficients part 355) when performing CSI omission (e.g., the payload of the CSI report exceeds the allowed number of allocated PUSCH resources).

The location and the part of the NZCs may be indicated by a set of bit or a bitmap. As such, the bitmap corresponding to the NZCs may be divided into respective bitmap groups (or bitmap parts), including bitmap part 335 and bitmap part 340. Bitmap part 335 may include number of bits that are based on a first half of the SD basis, a first half of the FD basis, a polarization metric, a first half of the one or more layers, the strength metric, or any combination thereof. Bitmap part 340 may include a second number of bits that are based on a second half of the SD basis, a second half of the FD basis, the polarization metric, a second half of the one or more layers, the strength metric, or any combination thereof. That is, respective portions of a bitmap may correspond to each group of NZCs (e.g., the first NZC group 305 and the second NZC group 310).

NZCs in the first and second NZC groups 305, 310 may be mapped according to a specific order of, for example, SD basis, FD basis, polarizations, and one or more layers. For example, the mapping order of the CSI components, as illustrated in mapping order 301, may follow the order of SD/FD basis indication 320, strongest coefficient indicator (SCI) 325, reference amplitude 330, bitmap part 335 (e.g., the first bitmap group indicating a location of the first NZC group), bitmap part 340 (e.g., the second bitmap group indicating a location of the second NZC group), the first NZC group (e.g., LC coefficient part 350), and the second NZC group (e.g., LC coefficient 355). In accordance with the CSI omission configuration 300, the second NZC group may be dropped from the CSI report, where the CSI omission configuration may be implicitly or explicitly indicated to the UE 115.

Figure 4:
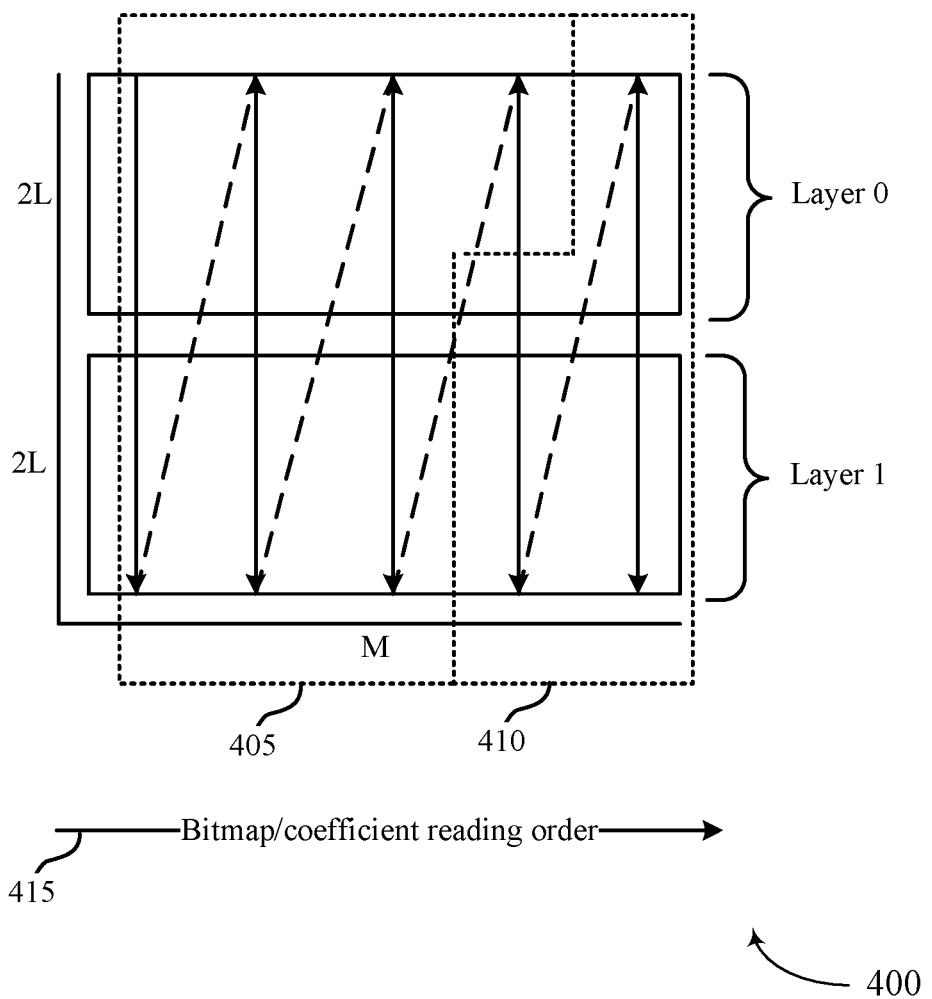

FIG. 4 illustrates an example of a CSI omission configuration 400 and mapping order 401 that support configurations for omitting CSI in accordance with aspects of the present disclosure. In some examples, CSI omission configuration 400 may implement aspects of wireless communications systems 100 and 200. A UE 115 may use CSI omission configuration 400 when reporting CSI to a base station 105. CSI omission configuration 400 may illustrate a configuration that omits of portion of NZCs from a CSI report. In some cases, CSI omission configuration 400 may also be referred to as a CSI omission rule, a CSI omission scheme, or other like terminology.

As described above, a CSI report may include at least one of an SD basis, an FD basis, an NNZC indicator indicating a total number of NNZC across a set of layers, additional NNZC indicators indicating the NNZC of each layer of one or more layers of the set of layers, a set of bitmaps indicating indices of NNZC of each layer of the plurality of layers, one or more SCI of each layer of one or more layers of the set of layers, quantizations of the plurality of the NNZCs of each of the one or more layers, or any combination thereof. The relation between the NZCs and bitmaps, as illustrated, may be 2L*M bits (e.g., L may refer to the number of SD basis and M may refer to the number of FD basis) in layer 0 and layer 1. The bitmap/coefficient reading order 415 may indicate how to read and report the coefficients and bitmap. For example, if layer 0 and layer 1 each have 2L*M bits indicating the NZCs, the order of the CSI coefficients may follow the packing order of layer 0 and layer 1 as indicated by the illustrated arrows.

As illustrated by CSI omission configuration 400, a UE 115 may use a second CSI omission configuration (e.g., implicitly indicated based on the CSI reporting parameters configured by the network or explicitly indicated by a base station) when omitting portions of the CSI report. In such cases, the UE may divide the total NZCs per layer (e.g., K) into a first NZC group and second NZC group. The first NZC group and the second NZC group may be based on the first half of the total NNZC and second half of the total NNZC. The first half and second half may be divided in terms of association of SD basis, FD basis, a polarization metric, layer, or a strength metric. In some examples, the first NZC group may be represented by $K_{NZ}^{tot}/2$ NZCs and the second NZC group may be represented by $K_{NZ}^{tot}/2$ NZCs.

In CSI omission configuration 400, the corresponding bitmaps may be divided into bitmap group 405 and bitmap group 410. Bitmap group 405 may include number of bits that are based on a RI value, a set of NNZCs for each layer of one or more layers, and the first portion of the NNZCs. Bitmap group 410 may include number of bits corresponding to the second half of the NNZCs. In some cases, bitmap group 405 may contain a number of bits which may be calculated by multiplying the RI value by 2LM and subtracting the first NZC group (e.g., same number of bits as the bits in $K_{NZ}^{tot}/2$ NZCs). That is, bitmap group 405 may include $RI \times 2LM - [K_{NZ}^{tot}/2]$ bits. Bitmap group 410 may contain the number of bits of $K_{NZ}^{tot}/2$ of the second NZC group.

In other cases, bitmap group 405 and bitmap group 410 may be based on SD basis (e.g., the first half of the total NNZCs and second half of the total NNZC), FD basis (e.g., the first half of the total NNZCs and second half of the total NNZC), a polarization metric, layer (e.g., the first half of the total NNZCs and second half of the total NNZC), or a strength metric. Bitmap group 405 may contain the number of bits of the first NZC group and bitmap group 410 may contain the number of bits of the second NZC group. The UE 115 may omit the second NZC group (e.g., corresponding to LC coefficients 440) and bitmap group 410 when the payload of the CSI report exceeds the allowed number of allocated PUSCH resources. In either case, CSI omission configuration 400 may enable the UE 115 to drop or omit both the second NZC group and the second bitmap group when reporting CSI.

NZCs in the first and second NZC groups may be mapped according to a specific order of SD basis, FD basis, a polarization metric, and one or more layers. For example, the mapping order (e.g., bitmap/coefficient reading order 415) of the CSI components, as illustrated in mapping order 401, may follow the order of SD/FD basis indication 420, SCI 425, reference amplitude 430, bitmap group 405 (e.g., a bitmap part) of the first NZC group, the first NZC group (e.g., LC coefficient 435), bitmap group 410 (e.g., a bitmap part) of the second NZC group, and the second NZC group (e.g., LC coefficient 440). As described herein, based on the selection of CSI omission configuration 400 when omitting portions of CSI, a UE 115 may omit both the second NZC group and the second bitmap group 410 (e.g., second bitmap part).

Figure 5:
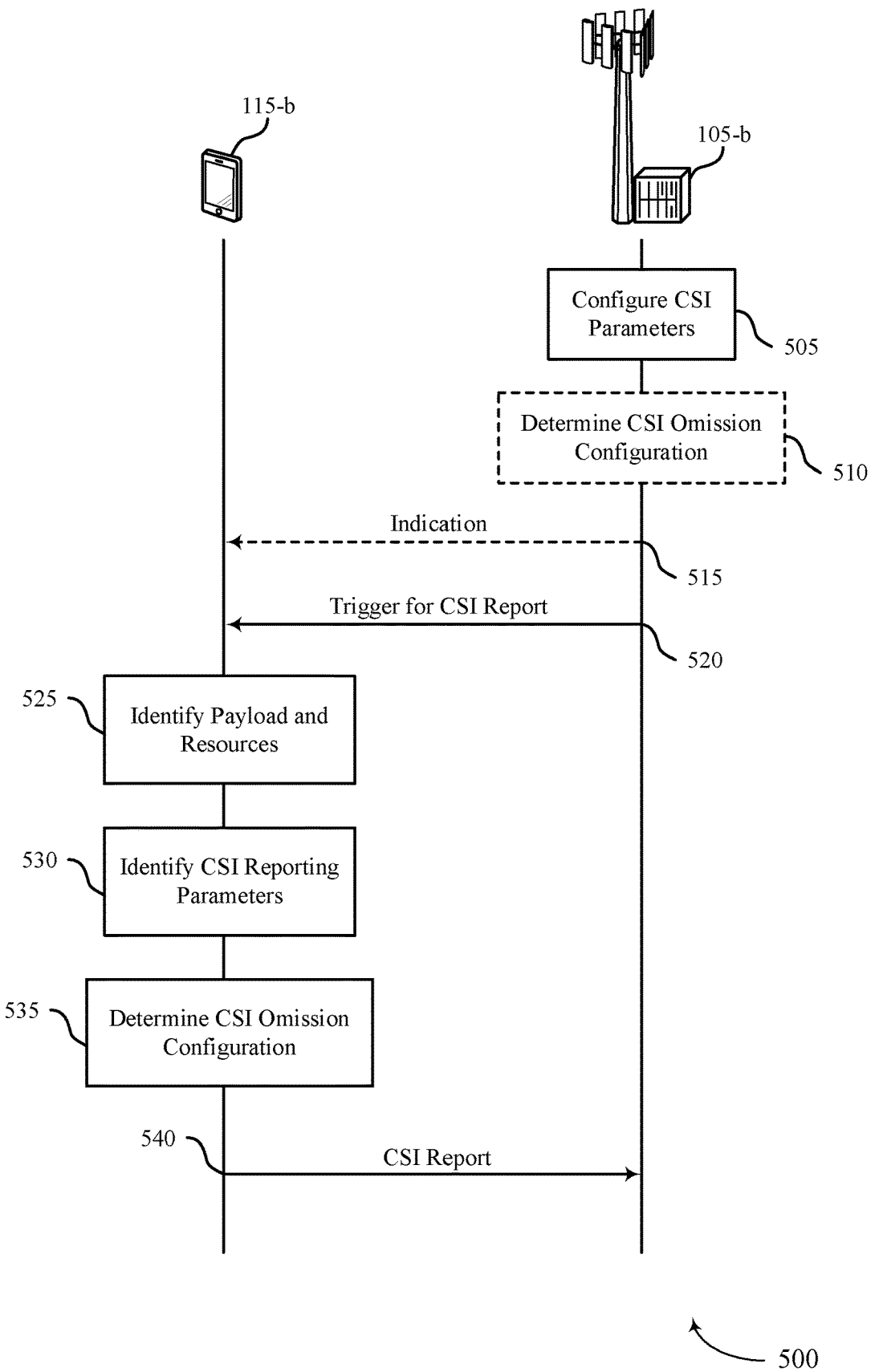
FIG. 5 illustrates an example of a process flow in a system that supports configurations for omitting CSI in accordance with aspects of the present disclosure.

FIG. 5 illustrates an example of a process flow 500 in a system that supports configurations for omitting CSI in accordance with aspects of the present disclosure. In some examples, process flow 500 may implement aspects of wireless communications systems 100 and 200. For instance, process flow 500 includes UE 115-b and base station 105-b, which may each be examples of the corresponding devices described with reference to FIGS. 1 and 2.

Process flow 500 may illustrate the determination of CSI omission rules based on one or more CSI parameters, where the CSI omission rules may be implicitly or explicitly indicated to a UE 115.

In some examples, at 505, base station 105-b may configure one or more CSI reporting parameters for a CSI report. The CSI reporting parameters may include a number of FD bases, a number of SD bases, NNZCs, or any combination thereof. In some cases, at 510, base station 105-b may optionally determine one or more CSI omission configurations that UE 115-b may use when transmitting the CSI report, where the CSI omission configuration may be based on the configured parameters. For instance, base station 105-b may select some CSI omission configuration based on the configured parameters, where UE 115-b may use the CSI omission configuration if/when CSI omission procedures are performed (e.g., when a CSI report payload exceeds a capacity of corresponding resources). In such cases, UE 115-b may or may not use the CSI omission configuration based on whether CSI omission is used.

In such cases, at 515, base station 105-b may optionally transmit (e.g., via RRC signaling) an indication, to UE 115-b, to use a particular CSI omission configuration from one of one or more CSI omission configurations (e.g., either a first or second CSI omission configuration, etc.) for omitting a portion of the CSI report. The indication may be based on the one or more CSI reporting parameters configured by base station 105-b at 505.

At 520, base station 105-b may transmit to UE 115-b a trigger for the CSI report (e.g., a Type II CSI feedback report). The trigger may be based on the one or more CSI reporting parameters configured by base station 105-b. At 525, UE 115-b may identify a payload for the CSI report and uplink resources for transmitting the CSI report based on the trigger from base station 105-b. In some examples, UE 115-b may identify that the payload of CSI report exceeds the uplink resources and determines to omit a portion of the CSI report.

At 530, UE 115-b may identify the one or more CSI reporting parameters associated with generating the CSI report. For instance, UE 115-b may identify the parameters from an RRC message that indicates a CSI report configuration. The CSI reporting parameters may include a number of FD basis, a number of SD basis, NNZCs, strength metric, one or more layers, or any combination thereof.

At 535, UE 115-b may determine to use one or more CSI omission configurations (e.g., the first or second CSI omission configuration) to omit a portion of the CSI report, where the determination to omit the portion of the CSI report may be based on the payload, the uplink resources, and CSI reporting parameters. UE 115-b may determine to use the first or second CSI omission configuration by receiving the indication from base station 105-a or implicitly after identifying one or more CSI reporting parameters.

As an example, UE 115-b may identify a configuration of a table associated with the one or more CSI reporting parameters (e.g., Table 1, as described with reference to FIG. 2), where determining to use the first or second CSI omission configurations to omit the portion of the CSI report may be based on the configuration of the table. In other cases, UE 115-b may identify respective values of the one or more CSI reporting parameters, where determining to use the one or more CSI omission configurations to omit the portion of the CSI report may be based on one or more of the respective values satisfying a threshold. In some cases, UE 115-b may determine to omit portions of the CSI report based on identifying that a number of coefficients (e.g., 2LM) for the CSI report satisfies a threshold based on the one or more CSI reporting parameters.

The first CSI omission configuration of the one or more CSI omission configurations, indicated by base station 105-*b* or determined to be used by UE 115-*b*, may correspond to the CSI report. The CSI report may include a first portion of the NNZCs and drop a second portion of the NNZCs. The first portion of the NNZCs and the second portion of the NNZCs may each be based on the SD basis, the FD basis, one or more layers, a strength metric, or any combination thereof. The second CSI omission configuration of the one or more CSI omission configurations, indicated by base station 105-*b* or determined to be used by UE 115-*b*, may correspond to the CSI report. The CSI report may include a first portion of the NNZCs and a first bitmap corresponding to a first portion of the NNZCs and drop a second portion of the NNZCs and a second bitmap corresponding to a second portion of the NNZCs. The first portion of the NNZCs and the second portion of the NNZCs may each be based on an SD basis, an FD basis, one or more layers, a strength metric, or any combination thereof.

In some examples, UE 115-*b* may determine CQI information for the CSI report based on PMI information. In some cases, UE 115-*b* may refrain from updating the computed CQI information after omitting the portion of the CSI report including a some PMI information. UE 115-*b* may include the determined CQI information in the CSI report. At 525, UE 115-*b* may transmit, to base station 105-*b*, the CSI report which excludes the omitted portion.

Figure 6:
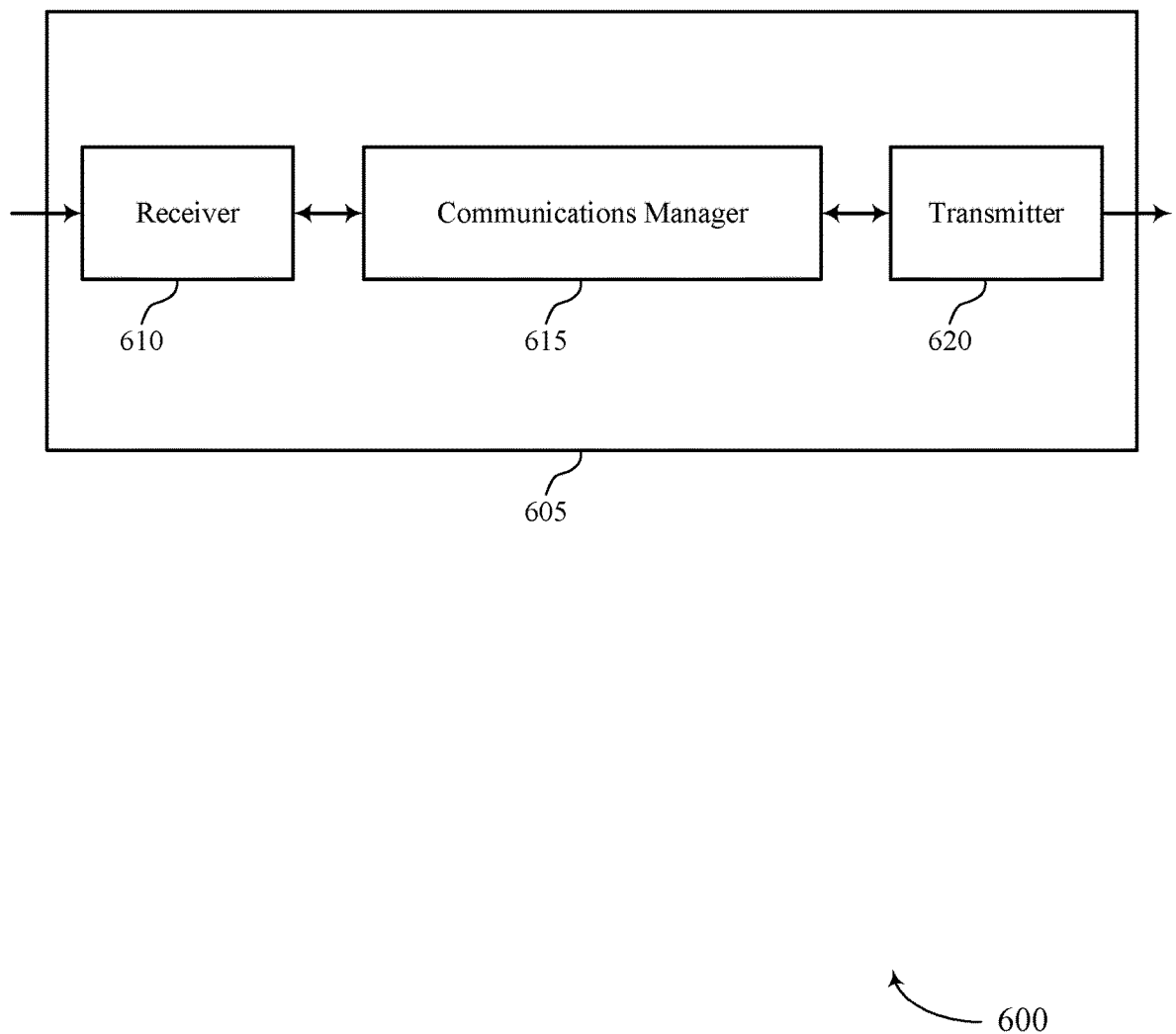
FIGS. 6 and 7 show block diagrams of devices that support configurations for omitting CSI in accordance with aspects of the present disclosure.

FIG. 6 shows a block diagram 600 of a device 605 that supports configurations for omitting CSI in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to configurations for omitting CSI, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a trigger for a CSI report, transmit, to the base station, the CSI report that excludes the omitted portion based on the determination, identify a payload for the CSI report and uplink resources for transmitting the CSI report based on the trigger, identify one or more CSI reporting parameters associated with generating the CSI report, the one or more CSI reporting parameters including a number of FD bases, a number of SD bases, NNZCs, or any combination thereof, and determine to use one or more CSI omission configurations to omit a portion of the CSI report, where the determination is based on the one or more CSI reporting parameters, the payload, and the uplink resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a UE 115 to achieve increased data rates and improved capacity through spectral efficiency. In particular, the selection of a CSI omission configuration may enable a UE 115 to save overhead when transmitting CSI reports to a network. As an additional advantage, one implementation may allow for a UE to save power through less complex operations for CSI omission using a particular CSI omission configuration (e.g., based on the configuration of one or more CSI reporting parameters). Another implementation may provide improved quality and reliability of service at the UE 115, as latency and the number of separate resources allocated to the UE 115 may be reduced.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
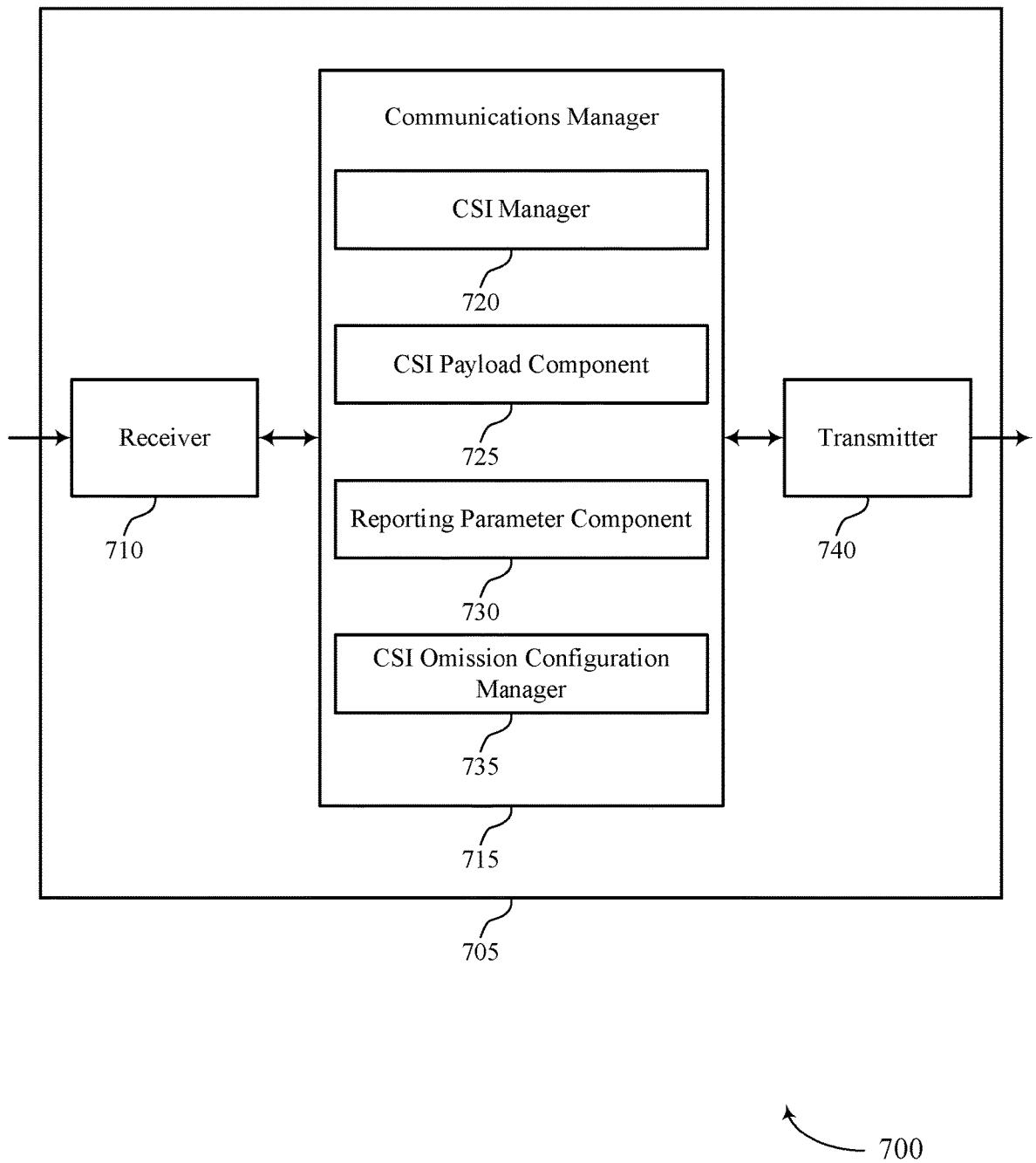

FIG. 7 shows a block diagram 700 of a device 705 that supports configurations for omitting CSI in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to configurations for omitting CSI, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CSI manager 720, a CSI payload component 725, a reporting parameter component 730, and a CSI omission configuration manager 735. The communications manager 715 may be an example of aspects of the communications manager 910 described herein.

The CSI manager 720 may receive, from a base station, a trigger for a CSI report and transmit, to the base station, the CSI report that excludes the omitted portion based on the determination. The CSI payload component 725 may identify a payload for the CSI report and uplink resources for transmitting the CSI report based on the trigger.

The reporting parameter component 730 may identify one or more CSI reporting parameters associated with generating the CSI report, the one or more CSI reporting parameters including a number of FD bases, a number of SD bases, NNZCs, or any combination thereof.

The CSI omission configuration manager 735 may determine to use one or more CSI omission configurations to omit a portion of the CSI report, where the determination is based on the one or more CSI reporting parameters, the payload, and the uplink resources.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Based on identifying at least one CSI omissions scheme, a processor of a UE 115 (e.g., controlling the receiver 710, the transmitter 740, or the transceiver 920 as described with reference to FIG. 9) may efficiently how to transmit a CSI report to a base station. The processor of the UE 115 may turn on one or more processing units for transmitting the CSI report, which may include increasing a processing clock, or a similar mechanism within the UE 115. As such, when the CSI configuration is identified, the processor may be ready to respond more efficiently through the reduction of a ramp up in processing power.

Figure 8:
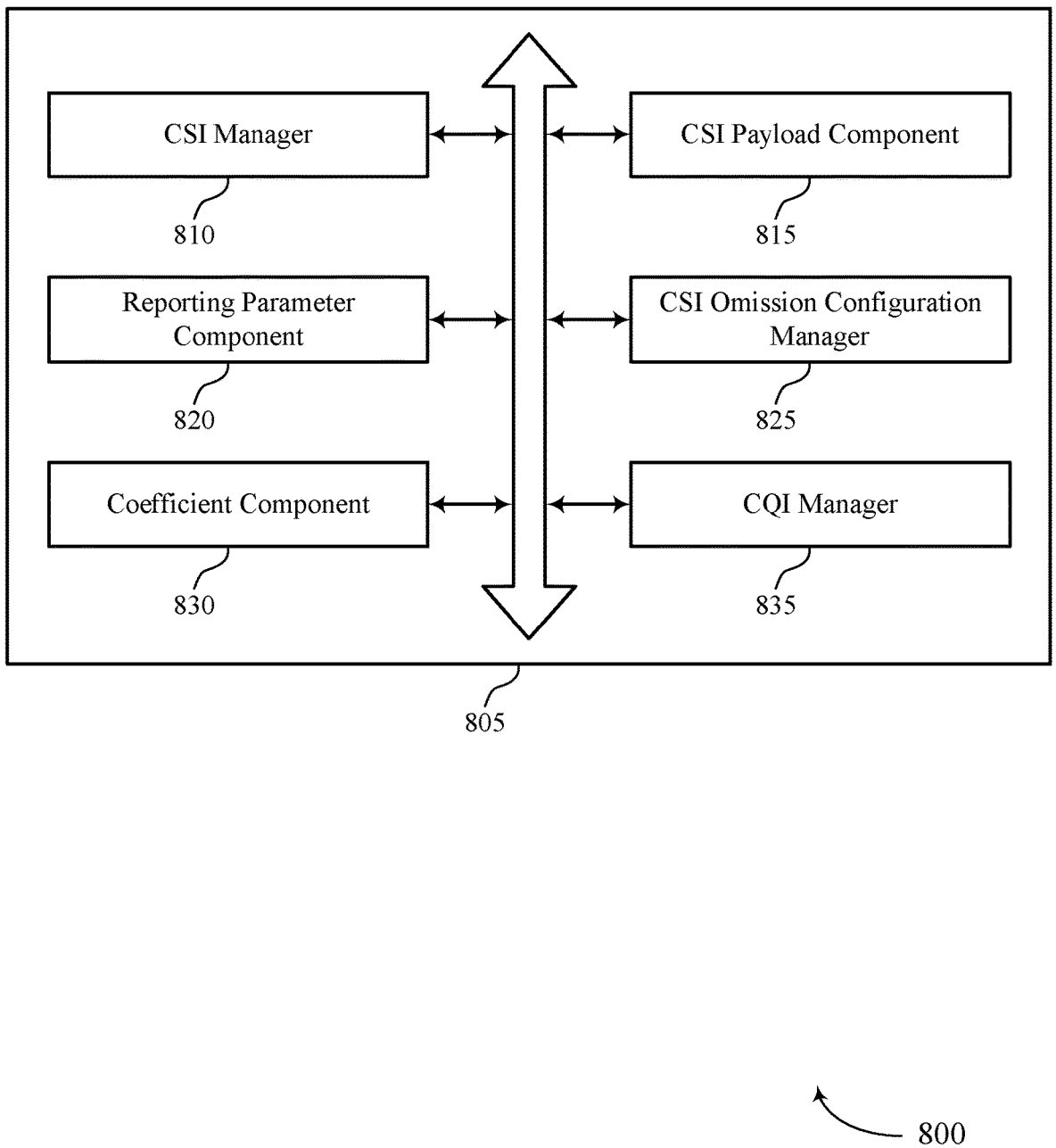
FIG. 8 shows a block diagram of a communications manager that supports configurations for omitting CSI in accordance with aspects of the present disclosure.

FIG. 8 shows a block diagram 800 of a communications manager 805 that supports configurations for omitting CSI in accordance with aspects of the present disclosure. The communications manager 805 may be an example of aspects of a communications manager 615, a communications manager 715, or a communications manager 910 described herein. The communications manager 805 may include a CSI manager 810, a CSI payload component 815, a reporting parameter component 820, a CSI omission configuration manager 825, a coefficient component 830, and a CQI manager 835. Each of these modules may communicate, directly or indirectly, with one another (e.g., via one or more buses).

The CSI manager 810 may receive, from a base station, a trigger for a CSI report.

In some examples, the CSI manager 810 may transmit, to the base station, the CSI report that excludes the omitted portion based on the determination.

In some examples, the CSI manager 810 may receive, from the base station, an indication to use one of the one or more CSI omission configurations.

In some examples, the CSI manager 810 may receive the indication via radio resource control signaling.

In some cases, the indication is based on the one or more CSI reporting parameters.

In some cases, the CSI report includes a Type II CSI report.

The CSI payload component 815 may identify a payload for the CSI report and uplink resources for transmitting the CSI report based on the trigger.

The reporting parameter component 820 may identify one or more CSI reporting parameters associated with generating the CSI report, the one or more CSI reporting parameters including a number of FD bases, a number of SD bases, NNZCs, or any combination thereof.

In some examples, the reporting parameter component 820 may identify a configuration of a table associated with the one or more CSI reporting parameters. In some examples, the reporting parameter component 820 may identify respective values of the one or more CSI reporting parameters. The CSI omission configuration manager 825 may determine to use one or more CSI omission configurations to omit a portion of the CSI report, where the determination is based on the one or more CSI reporting parameters, the payload, and the uplink resources.

In some examples, the CSI omission configuration manager 825 may determine to use the one of the one or more CSI omission configurations based on the received indication. In some examples, the CSI omission configuration manager 825 may determine to use one of the one or more CSI omission configurations based on the configuration of the table.

In some examples, the CSI omission configuration manager 825 may determine to use one of the one or more CSI omission configurations based on one or more of the respective values satisfying a threshold. In some examples, the CSI omission configuration manager 825 may determine to use one of the one or more CSI omission configurations based on the number of coefficients satisfying the threshold.

In some cases, a first CSI omission configuration of the one or more CSI omission configurations corresponds to the CSI report including at a first portion of the NNZCs and dropping a second portion of the NNZCs, where the first portion of the NNZCs and the second portion of the NNZCs are each based on an SD basis, an FD basis, one or more layers, a strength metric, or any combination thereof.

In some cases, a second CSI omission configuration of the one or more CSI omission configurations corresponds to the CSI report including a first portion of the NNZCs and a first bitmap corresponding to a first portion of the NNZCs and dropping a second portion of the NNZCs and a second bitmap corresponding to a second portion of the NNZCs, where the first portion of the NNZCs and the second portion of the NNZCs are each based on an SD basis, an FD basis, one or more layers, a strength metric, or any combination thereof.

In some cases, the first bitmap includes a first number of bits that are based on a rank indicator, a set of NNZCs for each layer of one or more layers, and the first portion of the NNZCs, and where the second bitmap includes a second number of bits corresponding to the second portion of the NNZCs.

In some cases, the first bitmap includes a first number of bits that are based on a first portion of the SD basis, a first portion of the FD basis, a polarization metric, a first portion of the one or more layers, the strength metric, or any combination thereof, and where the second bitmap includes a second number of bits that are based on a second portion of the SD basis, a second portion of the FD basis, the polarization metric, a second portion of the one or more layers, the strength metric, or any combination thereof.

The coefficient component 830 may identify that the number of coefficients for the CSI report satisfies a threshold based on the one or more CSI reporting parameters. The CQI manager 835 may determine CQI information for the CSI report based on precoding matrix indicator information.

In some examples, refraining from updating the determined CQI information after omitting the portion of the CSI report, where the omitted portion of the CSI report includes at least a portion of the precoding matrix indicator information. In some examples, the CQI manager 835 may include the determined CQI information in the CSI report.

Figure 9:
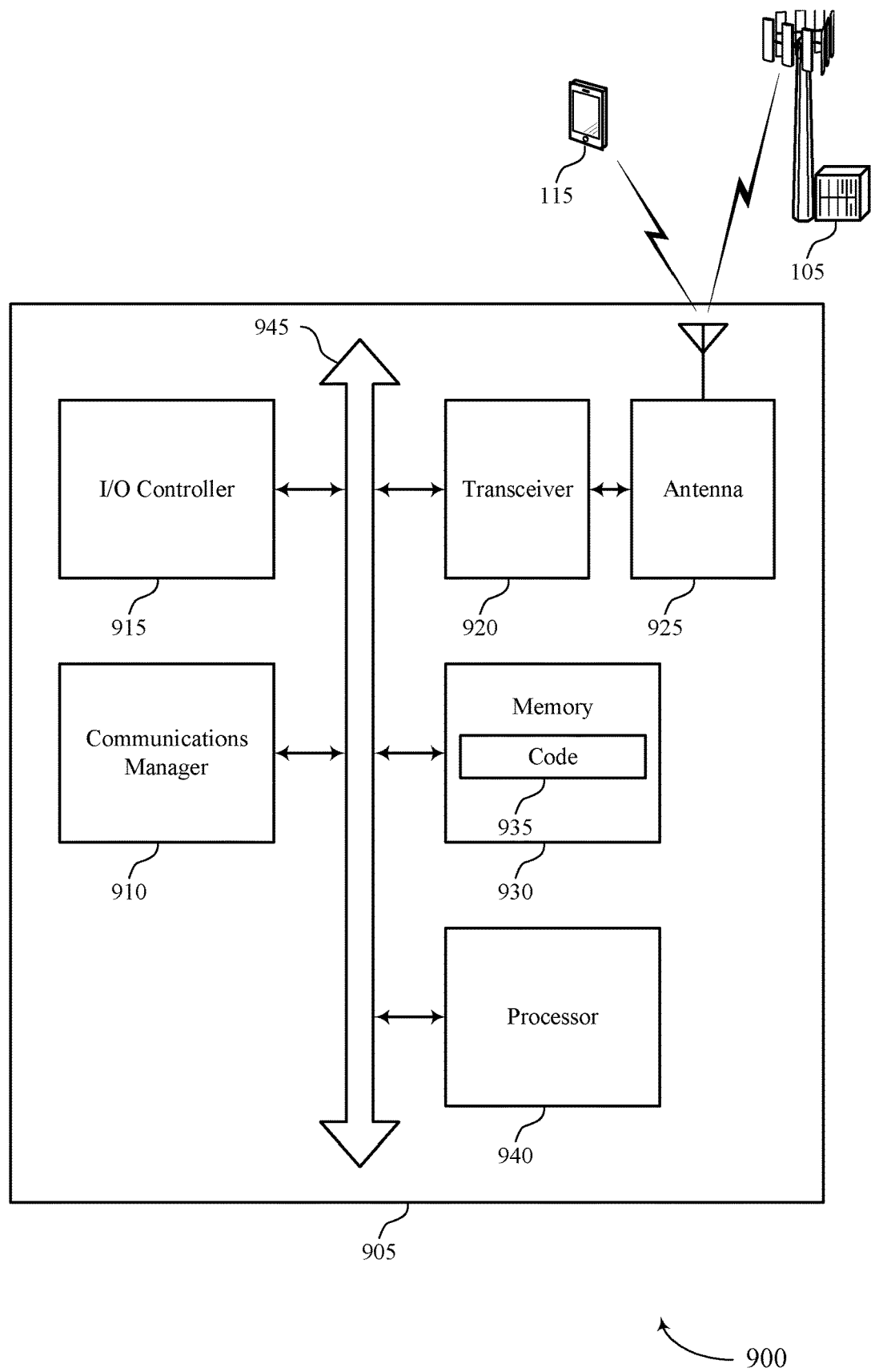
FIG. 9 shows a diagram of a system including a device that supports configurations for omitting CSI in accordance with aspects of the present disclosure.

FIG. 9 shows a diagram of a system 900 including a device 905 that supports configurations for omitting CSI in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a trigger for a CSI report, transmit, to the base station, the CSI report that excludes the omitted portion based on the determination, identify a payload for the CSI report and uplink resources for transmitting the CSI report based on the trigger, identify one or more CSI reporting parameters associated with generating the CSI report, the one or more CSI reporting parameters including a number of FD bases, a number of SD bases, NNZCs, or any combination thereof, and determine to use one or more CSI omission configurations to omit a portion of the CSI report, where the determination is based on the one or more CSI reporting parameters, the payload, and the uplink resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting configurations for omitting CSI).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
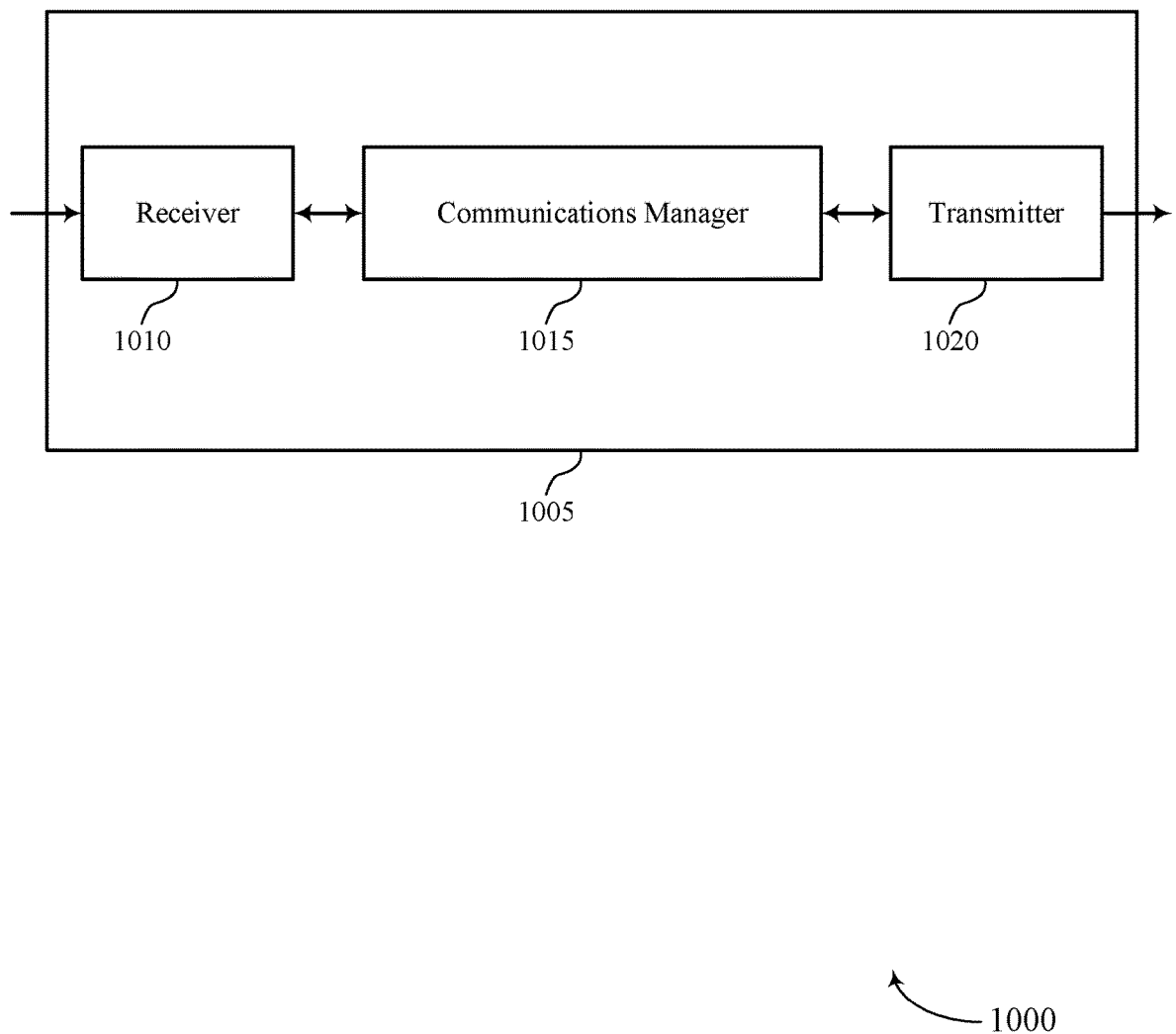
FIGS. 10 and 11 show block diagrams of devices that support configurations for omitting CSI in accordance with aspects of the present disclosure.

FIG. 10 shows a block diagram 1000 of a device 1005 that supports configurations for omitting CSI in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to configurations for omitting CSI, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure one or more CSI reporting parameters for a CSI report, the one or more CSI reporting parameters including a number of FD bases, a number of SD bases, NNZCs, or any combination thereof, transmit, to a UE, an indication to use one of one or more CSI omission configurations for omitting a portion of the CSI report, transmit, to the UE, a trigger for the CSI report that is based on the configured one or more CSI reporting parameters, and receive, from the UE, the CSI report that omits a portion of the CSI report in accordance with the one of the one or more CSI omission configurations based on the indication. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
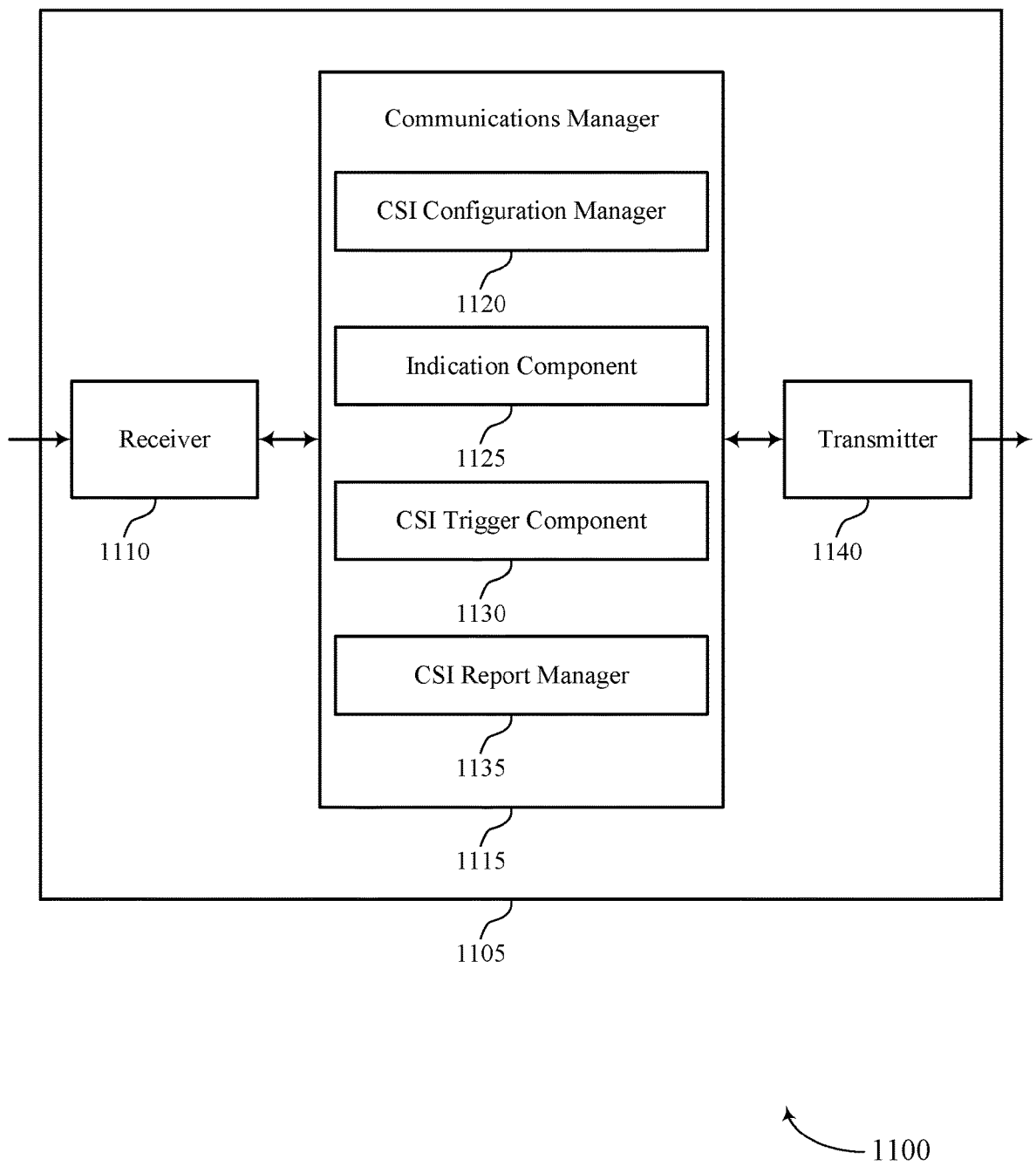

FIG. 11 shows a block diagram 1100 of a device 1105 that supports configurations for omitting CSI in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to configurations for omitting CSI, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CSI configuration manager 1120, an indication component 1125, a CSI trigger component 1130, and a CSI report manager 1135. The communications manager 1115 may be an example of aspects of the communications manager 1310 described herein.

The CSI configuration manager 1120 may configure one or more CSI reporting parameters for a CSI report, the one or more CSI reporting parameters including a number of FD bases, a number of SD bases, NNZCs, or any combination thereof.

The indication component 1125 may transmit, to a UE, an indication to use one of one or more CSI omission configurations for omitting a portion of the CSI report.

The CSI trigger component 1130 may transmit, to the UE, a trigger for the CSI report that is based on the configured one or more CSI reporting parameters.

The CSI report manager 1135 may receive, from the UE, the CSI report that omits a portion of the CSI report in accordance with the one of the one or more CSI omission configurations based on the indication.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
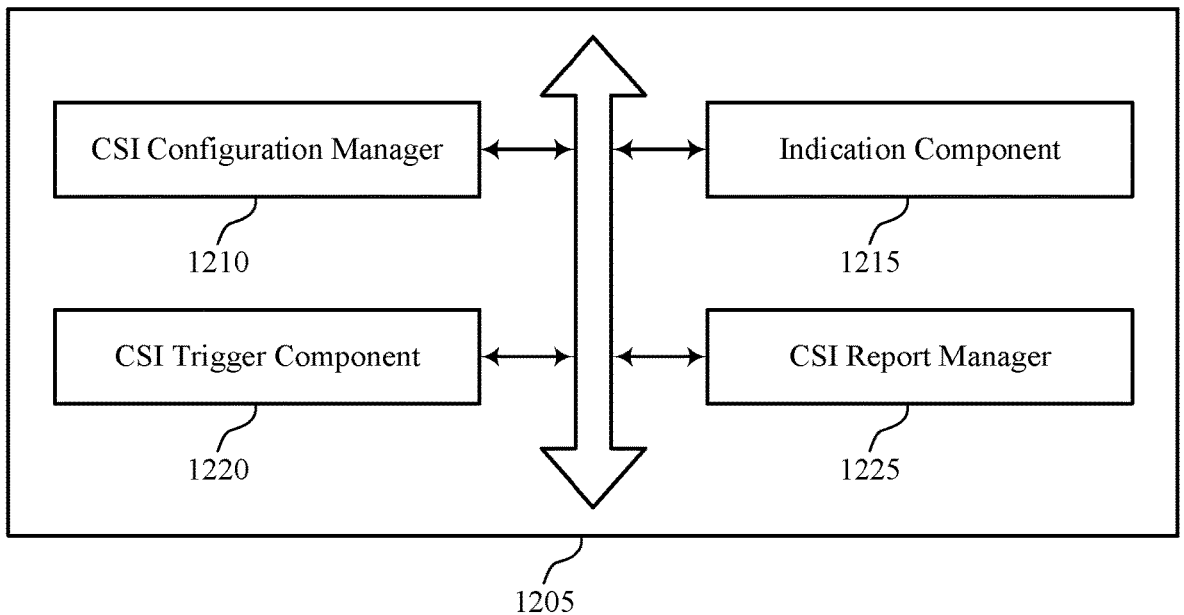
FIG. 12 shows a block diagram of a communications manager that supports configurations for omitting CSI in accordance with aspects of the present disclosure.

FIG. 12 shows a block diagram 1200 of a communications manager 1205 that supports configurations for omitting CSI in accordance with aspects of the present disclosure. The communications manager 1205 may be an example of aspects of a communications manager 1015, a communications manager 1115, or a communications manager 1310 described herein. The communications manager 1205 may include a CSI configuration manager 1210, an indication component 1215, a CSI trigger component 1220, and a CSI report manager 1225. Each of these modules may communicate, directly or indirectly, with one another (e.g., via one or more buses).

The CSI configuration manager 1210 may configure one or more CSI reporting parameters for a CSI report, the one or more CSI reporting parameters including a number of FD bases, a number of SD bases, NNZCs, or any combination thereof.

In some cases, a first CSI omission configuration of the one or more CSI omission configurations corresponds to the CSI report including at least a first portion of the NNZCs and excluding a second portion of the NNZCs, where the first portion of the NNZCs and the second portion of the NNZCs are each based on an SD basis, an FD basis, one or more layers, a strength metric, or any combination thereof.

In some cases, a second CSI omission configuration of the one or more CSI omission configurations corresponds to the CSI report including a first portion of the NNZCs and a first bitmap corresponding to the first portion of the NNZCs and dropping a second portion of the NNZCs and a second bitmap corresponding to the second portion of the NNZCs, where the first portion of the NNZCs and the second portion of the NNZCs are each based on an SD basis, an FD basis, one or more layers, a strength metric, or any combination thereof.

In some cases, the first bitmap includes a first number of bits that are based on a rank indicator, a set of NNZCs for each layer of one or more layers, and the first portion of the NNZCs, and where the second bitmap includes a second number of bits corresponding to the second portion of the NNZCs.

In some cases, the first bitmap includes a first number of bits that are based on a first portion of the SD basis, a first portion of the FD basis, a polarization metric, a first portion of the one or more layers, the strength metric, or any combination thereof, and where the second bitmap includes a second number of bits that are based on a second portion of the SD basis, a second portion of the FD basis, the polarization metric, a second portion of the one or more layers, the strength metric, or any combination thereof.

The indication component 1215 may transmit, to a UE, an indication to use one of one or more CSI omission configurations for omitting a portion of the CSI report.

In some examples, the indication component 1215 may transmit the indication via radio resource control signaling.

The CSI trigger component 1220 may transmit, to the UE, a trigger for the CSI report that is based on the configured one or more CSI reporting parameters.

The CSI report manager 1225 may receive, from the UE, the CSI report that omits a portion of the CSI report in accordance with the one of the one or more CSI omission configurations based on the indication.

In some cases, the CSI report includes a Type II CSI report.

Figure 13:
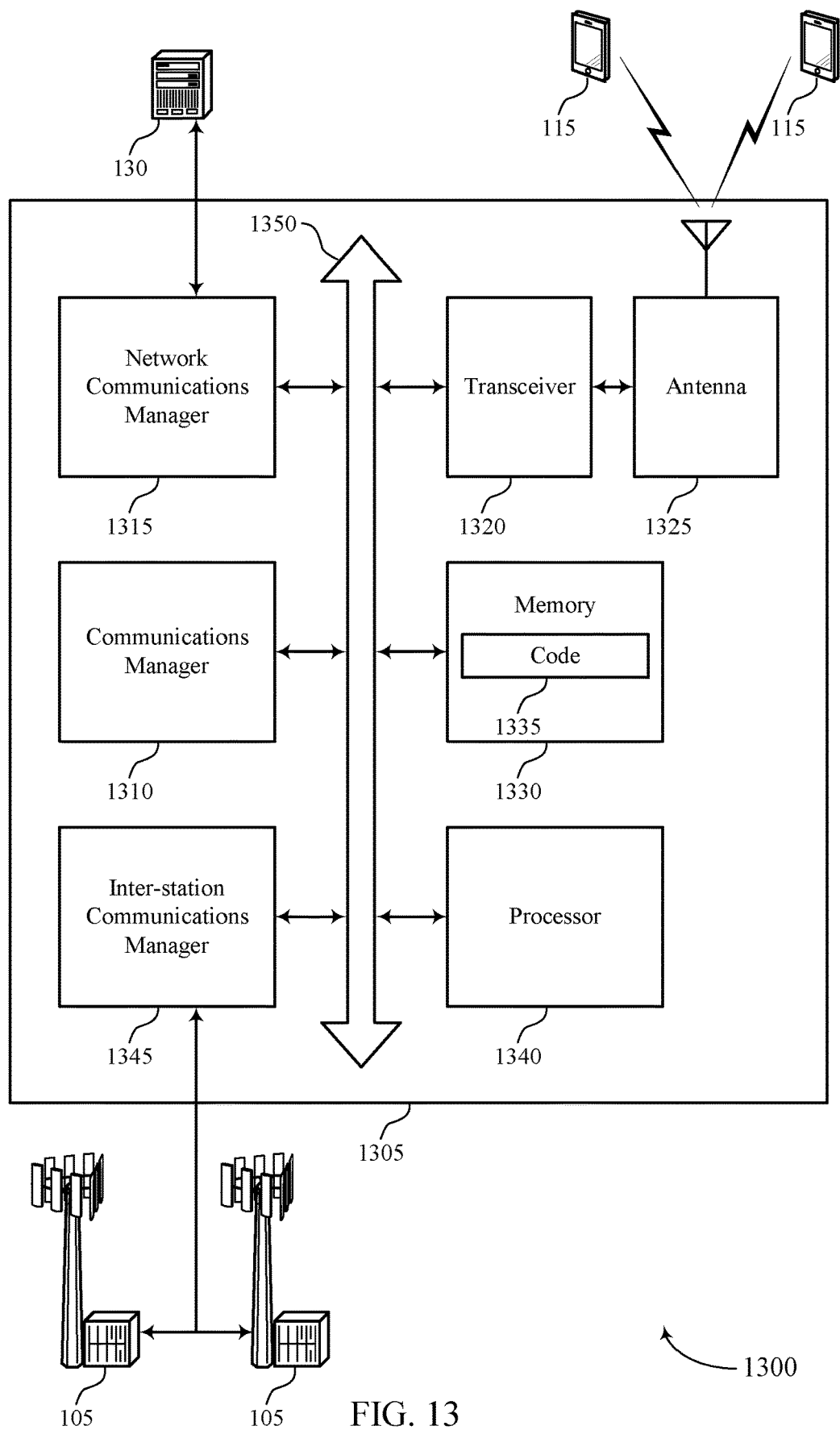
FIG. 13 shows a diagram of a system including a device that supports configurations for omitting CSI in accordance with aspects of the present disclosure.

FIG. 13 shows a diagram of a system 1300 including a device 1305 that supports configurations for omitting CSI in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure one or more CSI reporting parameters for a CSI report, the one or more CSI reporting parameters including a number of FD bases, a number of SD bases, NNZCs, or any combination thereof, transmit, to a UE, an indication to use one of one or more CSI omission configurations for omitting a portion of the CSI report, transmit, to the UE, a trigger for the CSI report that is based on the configured one or more CSI reporting parameters, and receive, from the UE, the CSI report that omits a portion of the CSI report in accordance with the one of the one or more CSI omission configurations based on the indication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting configurations for omitting CSI).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
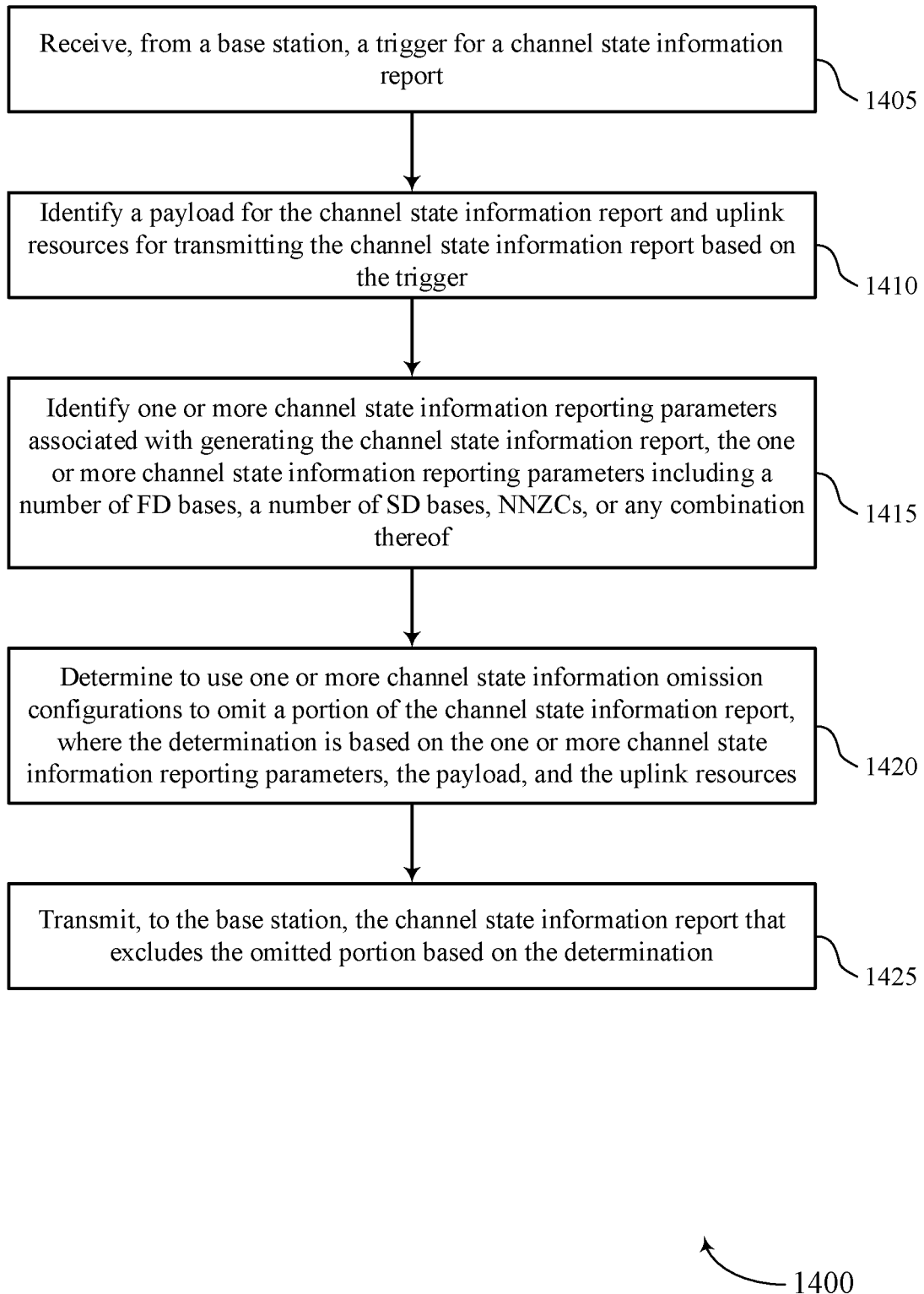
FIGS. 14 through 17 show flowcharts illustrating methods that support configurations for omitting CSI in accordance with aspects of the present disclosure.

FIG. 14 shows a flowchart illustrating a method 1400 that supports configurations for omitting CSI in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a trigger for a CSI report. The operations of 1405 may be performed according to the methods described herein. In some examples, aspects of the operations of 1405 may be performed by a CSI manager as described with reference to FIGS. 6 through 9.

At 1410, the UE may identify a payload for the CSI report and uplink resources for transmitting the CSI report based on the trigger. The operations of 1410 may be performed according to the methods described herein. In some examples, aspects of the operations of 1410 may be performed by a CSI payload component as described with reference to FIGS. 6 through 9.

At 1415, the UE may identify one or more CSI reporting parameters associated with generating the CSI report, the one or more CSI reporting parameters including a number of FD bases, a number of SD bases, NNZCs, or any combination thereof. The operations of 1415 may be performed according to the methods described herein. In some examples, aspects of the operations of 1415 may be performed by a reporting parameter component as described with reference to FIGS. 6 through 9.

At 1420, the UE may determine to use one or more CSI omission configurations to omit a portion of the CSI report, where the determination is based on the one or more CSI reporting parameters, the payload, and the uplink resources. The operations of 1420 may be performed according to the methods described herein. In some examples, aspects of the operations of 1420 may be performed by a CSI omission configuration manager as described with reference to FIGS. 6 through 9.

At 1425, the UE may transmit, to the base station, the CSI report that excludes the omitted portion based on the determination. The operations of 1425 may be performed according to the methods described herein. In some examples, aspects of the operations of 1425 may be performed by a CSI manager as described with reference to FIGS. 6 through 9.

Figure 15:
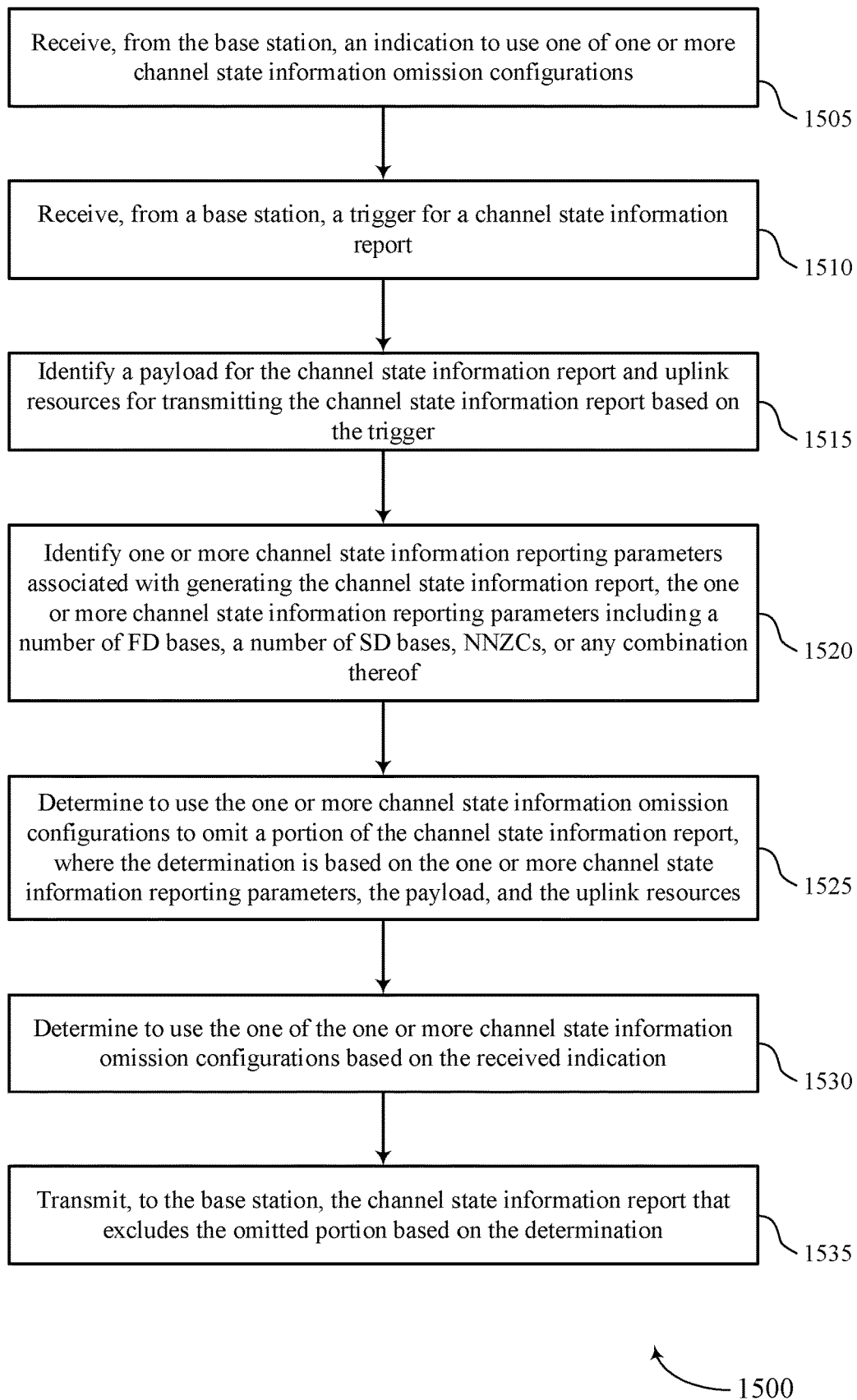

FIG. 15 shows a flowchart illustrating a method 1500 that supports configurations for omitting CSI in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from the base station, an indication to use one of the one or more CSI omission configurations. The operations of 1505 may be performed according to the methods described herein. In some examples, aspects of the operations of 1505 may be performed by a CSI manager as described with reference to FIGS. 6 through 9.

At 1510, the UE may receive, from a base station, a trigger for a CSI report. The operations of 1510 may be performed according to the methods described herein. In some examples, aspects of the operations of 1510 may be performed by a CSI manager as described with reference to FIGS. 6 through 9.

At 1515, the UE may identify a payload for the CSI report and uplink resources for transmitting the CSI report based on the trigger. The operations of 1515 may be performed according to the methods described herein. In some examples, aspects of the operations of 1515 may be performed by a CSI payload component as described with reference to FIGS. 6 through 9.

At 1520, the UE may identify one or more CSI reporting parameters associated with generating the CSI report, the one or more CSI reporting parameters including a number of FD bases, a number of SD bases, NNZCs, or any combination thereof. The operations of 1520 may be performed according to the methods described herein. In some examples, aspects of the operations of 1520 may be performed by a reporting parameter component as described with reference to FIGS. 6 through 9.

At 1525, the UE may determine to use one or more CSI omission configurations to omit a portion of the CSI report, where the determination is based on the one or more CSI reporting parameters, the payload, and the uplink resources. The operations of 1525 may be performed according to the methods described herein. In some examples, aspects of the operations of 1525 may be performed by a CSI omission configuration manager as described with reference to FIGS. 6 through 9.

At 1530, the UE may determine to use the one of the one or more CSI omission configurations based on the received indication. The operations of 1530 may be performed according to the methods described herein. In some examples, aspects of the operations of 1530 may be performed by a CSI omission configuration manager as described with reference to FIGS. 6 through 9.

At 1535, the UE may transmit, to the base station, the CSI report that excludes the omitted portion based on the determination. The operations of 1535 may be performed according to the methods described herein. In some examples, aspects of the operations of 1535 may be performed by a CSI manager as described with reference to FIGS. 6 through 9.

Figure 16:
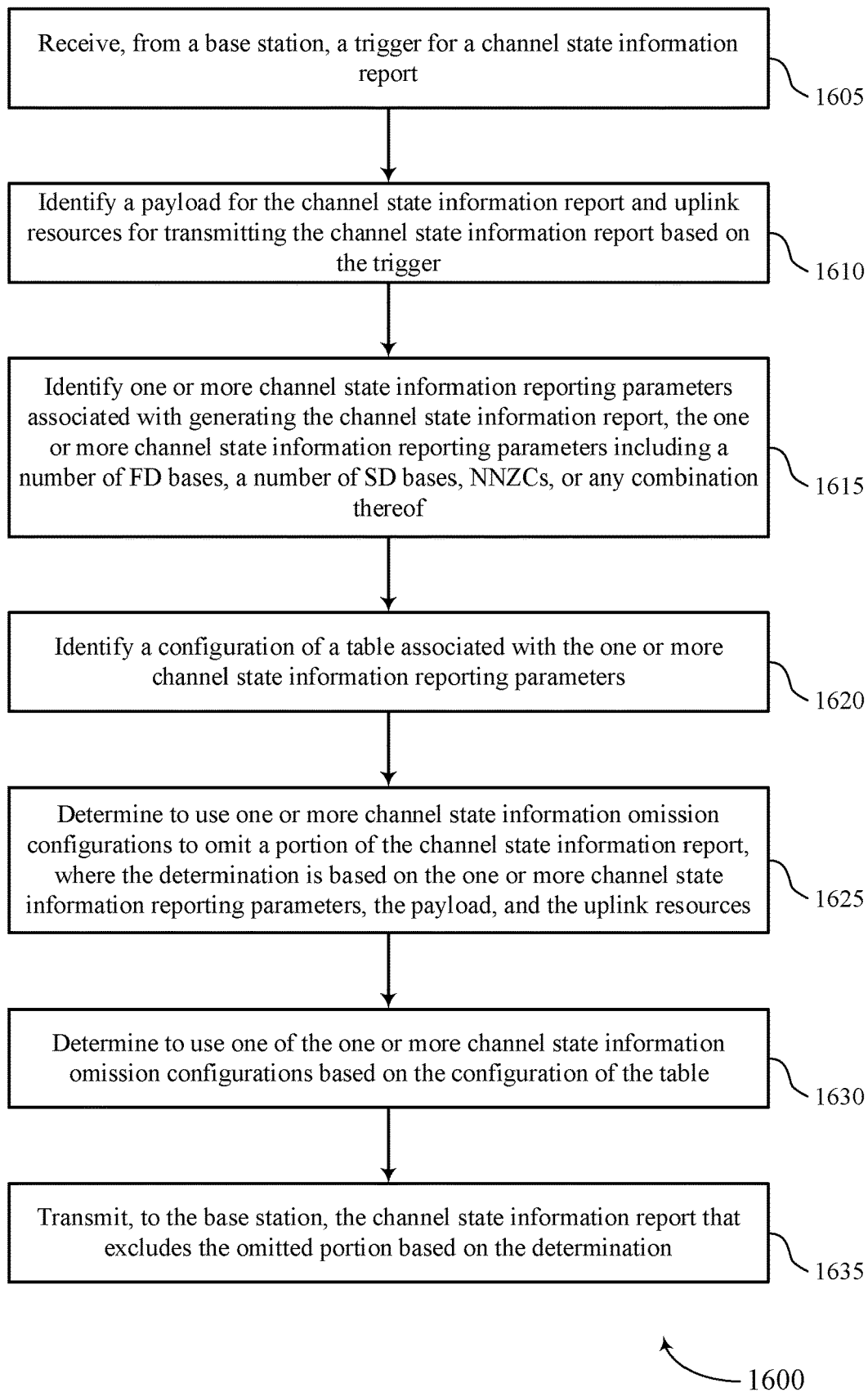

FIG. 16 shows a flowchart illustrating a method 1600 that supports configurations for omitting CSI in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a trigger for a CSI report. The operations of 1605 may be performed according to the methods described herein. In some examples, aspects of the operations of 1605 may be performed by a CSI manager as described with reference to FIGS. 6 through 9.

At 1610, the UE may identify a payload for the CSI report and uplink resources for transmitting the CSI report based on the trigger. The operations of 1610 may be performed according to the methods described herein. In some examples, aspects of the operations of 1610 may be performed by a CSI payload component as described with reference to FIGS. 6 through 9.

At 1615, the UE may identify one or more CSI reporting parameters associated with generating the CSI report, the one or more CSI reporting parameters including a number of FD bases, a number of SD bases, NNZCs, or any combination thereof. The operations of 1615 may be performed according to the methods described herein. In some examples, aspects of the operations of 1615 may be performed by a reporting parameter component as described with reference to FIGS. 6 through 9.

At 1620, the UE may identify a configuration of a table associated with the one or more CSI reporting parameters. The operations of 1620 may be performed according to the methods described herein. In some examples, aspects of the operations of 1620 may be performed by a reporting parameter component as described with reference to FIGS. 6 through 9.

At 1625, the UE may determine to use one or more CSI omission configurations to omit a portion of the CSI report, where the determination is based on the one or more CSI reporting parameters, the payload, and the uplink resources. The operations of 1625 may be performed according to the methods described herein. In some examples, aspects of the operations of 1625 may be performed by a CSI omission configuration manager as described with reference to FIGS. 6 through 9.

At 1630, the UE may determine to use one of the one or more CSI omission configurations based on the configuration of the table. The operations of 1630 may be performed according to the methods described herein. In some examples, aspects of the operations of 1630 may be performed by a CSI omission configuration manager as described with reference to FIGS. 6 through 9.

At 1635, the UE may transmit, to the base station, the CSI report that excludes the omitted portion based on the determination. The operations of 1635 may be performed according to the methods described herein. In some examples, aspects of the operations of 1635 may be performed by a CSI manager as described with reference to FIGS. 6 through 9.

Figure 17:
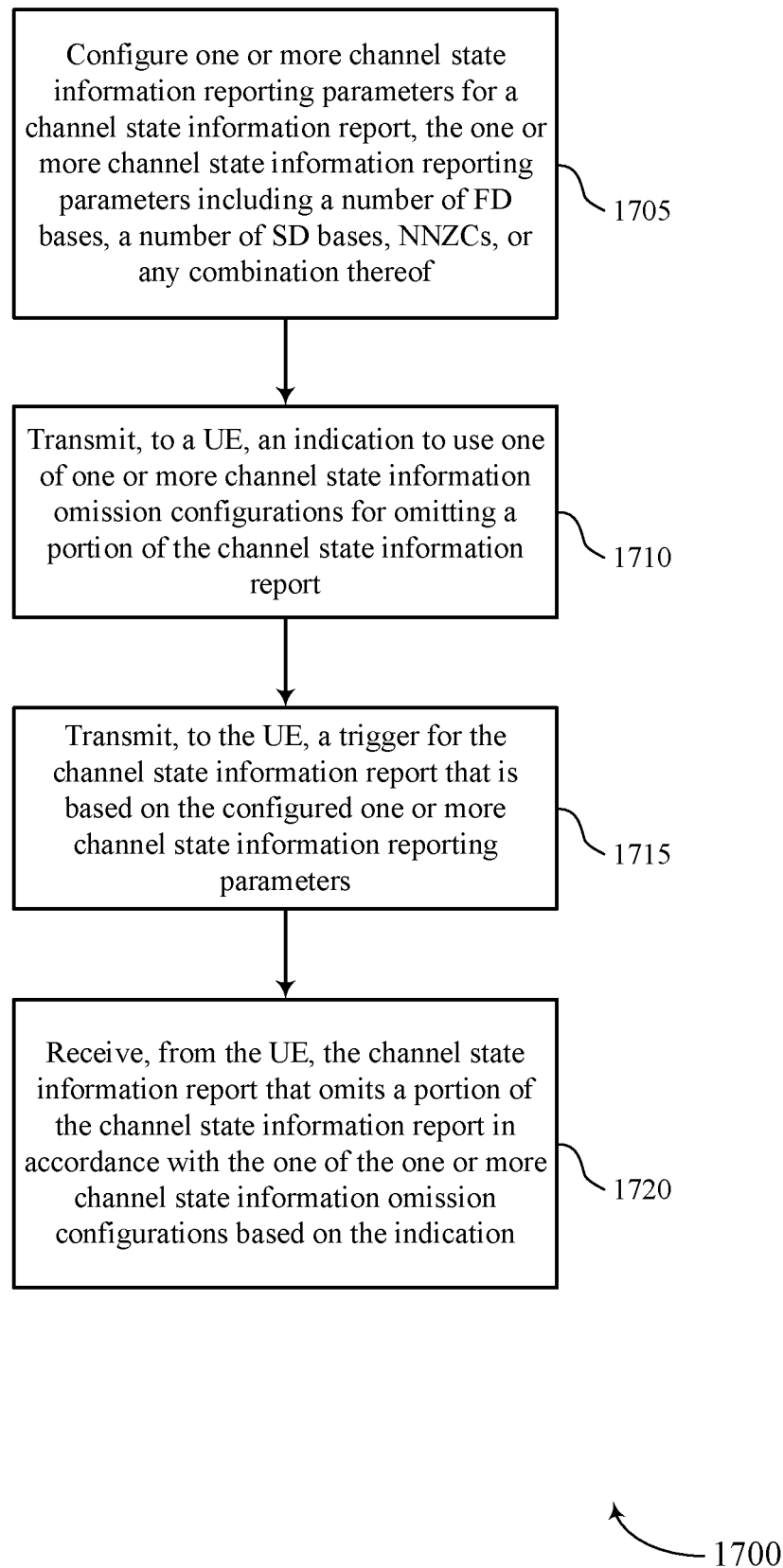

FIG. 17 shows a flowchart illustrating a method 1700 that supports configurations for omitting CSI in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may configure one or more CSI reporting parameters for a CSI report, the one or more CSI reporting parameters including a number of FD bases, a number of SD bases, NNZCs, or any combination thereof. The operations of 1705 may be performed according to the methods described herein. In some examples, aspects of the operations of 1705 may be performed by a CSI configuration manager as described with reference to FIGS. 10 through 13.

At 1710, the base station may transmit, to a UE, an indication to use one of one or more CSI omission configurations for omitting a portion of the CSI report. The operations of 1710 may be performed according to the methods described herein. In some examples, aspects of the operations of 1710 may be performed by an indication component as described with reference to FIGS. 10 through 13.

At 1715, the base station may transmit, to the UE, a trigger for the CSI report that is based on the configured one or more CSI reporting parameters. The operations of 1715 may be performed according to the methods described herein. In some examples, aspects of the operations of 1715 may be performed by a CSI trigger component as described with reference to FIGS. 10 through 13.

At 1720, the base station may receive, from the UE, the CSI report that omits a portion of the CSI report in accordance with the one of the one or more CSI omission configurations based on the indication. The operations of 1720 may be performed according to the methods described herein. In some examples, aspects of the operations of 1720 may be performed by a CSI report manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication comprising:
    at least one memory; and
    at least one processor coupled to the at least one memory, wherein the at least one processor is configured to:
    receive, from a base station, a trigger for a channel state information report;
    identify a payload for the channel state information report and uplink resources for transmitting the channel state information report based at least in part on the trigger;
    identify one or more channel state information reporting parameters associated with generating the channel state information report, the one or more channel state information reporting parameters comprising a number of frequency domain bases, a number of spatial domain bases, a number of non-zero coefficients (NNZCs), or any combination thereof;
    determine to use one or more channel state information omission configurations to omit a portion of the channel state information report, wherein the determination is based at least in part on the one or more channel state information reporting parameters, the payload, and the uplink resources, wherein a first channel state information omission configuration of the one or more channel state information omission configurations corresponds to the channel state information report including at least a first portion of the NNZCs and dropping at least a second portion of the NNZCs, wherein the first portion of the NNZCs and the second portion of the NNZCs are each based at least in part on a spatial domain basis, a frequency domain basis, one or more layers, a strength metric, or any combination thereof; and
    transmit, to the base station, the channel state information report that excludes the omitted portion based at least in part on the determination.

2. The UE of claim 1, wherein the at least one processor is further configured to:
    receive, from the base station, an indication to use one of the one or more channel state information omission configurations; and
    determine to use the one of the one or more channel state information omission configurations based at least in part on the received indication.

3. The UE of claim 1, wherein the at least one processor is further configured to:
    identify a configuration of a table associated with the one or more channel state information reporting parameters; and
    determine to use one of the one or more channel state information omission configurations based at least in part on the configuration of the table.

4. The UE of claim 1, wherein the at least one processor is further configured to:
    identify respective values of the one or more channel state information reporting parameters; and
    determine to use one of the one or more channel state information omission configurations based at least in part on one or more of the respective values satisfying a threshold.

5. The UE of claim 1, wherein the at least one processor is further configured to:
    identify that a number of coefficients for the channel state information report satisfies a threshold based at least in part on the one or more channel state information reporting parameters; and
    determine to use one of the one or more channel state information omission configurations based at least in part on the number of coefficients satisfying the threshold.

6. The UE of claim 1, wherein the at least one processor is further configured to:
    determineng channel quality indicator information for the channel state information report based at least in part on precoding matrix indicator information;
    refrain from updating the determined channel quality indicator information after omitting the portion of the channel state information report, wherein the omitted portion of the channel state information report comprises at least a portion of the precoding matrix indicator information; and
    include the determined channel quality indicator information in the channel state information report.

7. The UE of claim 1, wherein a second channel state information omission configuration of the one or more channel state information omission configurations corresponds to the channel state information report including the first portion of the NNZCs and a first bitmap corresponding to the first portion of the NNZCs and dropping the second portion of the NNZCs and a second bitmap corresponding to the second portion of the NNZCs.

8. The method of claim 7, wherein the first bitmap comprises a first number of bits that are based at least in part on a rank indicator, a set of NNZCs for each layer of one or more layers, and the first portion of the NNZCs, and wherein the second bitmap comprises a second number of bits corresponding to the second portion of the NNZCs.

9. The UE of claim 7, wherein the first bitmap comprises a first number of bits that are based at least in part on a first portion of the spatial domain basis, a first portion of the frequency domain basis, a polarization metric, a first portion of the one or more layers, the strength metric, or any combination thereof, and wherein the second bitmap comprises a second number of bits that are based at least in part on a second portion of the spatial domain basis, a second portion of the frequency domain basis, the polarization metric, a second portion of the one or more layers, the strength metric, or any combination thereof.

10. A base station for wireless communication, comprising:
at least one memory; and
at least one processor coupled to the at least one memory, wherein the at least one processor is configured to:
configure one or more channel state information reporting parameters for a channel state information report, the one or more channel state information reporting parameters comprising a number of frequency domain bases, a number of spatial domain bases, a number of non-zero coefficients (NNZCs), or any combination thereof;
transmit, to a user equipment (UE), an indication to use one of one or more channel state information omission configurations for omitting a portion of the channel state information report, wherein a first channel state information omission configuration of the one or more channel state information omission configurations corresponds to the channel state information report including at least a first portion of the NNZCs and excluding at least a second portion of the NNZCs, wherein the first portion of the NNZCs and the second portion of the NNZCs are each based at least in part on a spatial domain basis, a frequency domain basis, one or more layers, a strength metric, or any combination thereof;
transmit, to the UE, a trigger for the channel state information report that is based at least in part on the configured one or more channel state information reporting parameters; and
receive, from the UE, the channel state information report that omits a portion of the channel state information report in accordance with the one of the one or more channel state information omission configurations based at least in part on the indication.

11. The base station method of claim 10, wherein a second channel state information omission configuration of the one or more channel state information omission configurations corresponds to the channel state information report including the first portion of the NNZCs and a first bitmap corresponding to the first portion of the NNZCs and dropping the second portion of the NNZCs and a second bitmap corresponding to the second portion of the NNZCs.

12. The base station of claim 11, wherein the first bitmap comprises a first number of bits that are based at least in part on a rank indicator, a set of NNZCs for each layer of one or more layers, and the first portion of the NNZCs, and wherein the second bitmap comprises a second number of bits corresponding to the second portion of the NNZCs.

13. The base station of claim 11, wherein the first bitmap comprises a first number of bits that are based at least in part on a first portion of the spatial domain basis, a first portion of the frequency domain basis, a polarization metric, a first portion of the one or more layers, the strength metric, or any combination thereof, and wherein the second bitmap comprises a second number of bits that are based at least in part on a second portion of the spatial domain basis, a second portion of the frequency domain basis, the polarization metric, a second portion of the one or more layers, the strength metric, or any combination thereof.

14. A method for wireless communication performed by a user equipment (UE), comprising:
receiving, from a base station, a trigger for a channel state information report;
identifying a payload for the channel state information report and uplink resources for transmitting the channel state information report based at least in part on the trigger;
identifying one or more channel state information reporting parameters associated with generating the channel state information report, the one or more channel state information reporting parameters comprising a number of frequency domain bases, a number of spatial domain bases, a number of non-zero coefficients (NNZCs), or any combination thereof;
determining to use one or more channel state information omission configurations to omit a portion of the channel state information report, wherein the determination is based at least in part on the one or more channel state information reporting parameters, the payload, and the uplink resources, wherein a first channel state information omission configuration of the one or more channel state information omission configurations corresponds to the channel state information report including at least a first portion of the NNZCs and dropping at least a second portion of the NNZCs, wherein the first portion of the NNZCs and the second portion of the NNZCs are each based at least in part on a spatial domain basis, a frequency domain basis, one or more layers, a strength metric, or any combination thereof; and
transmitting, to the base station, the channel state information report that excludes the omitted portion based at least in part on the determination.

15. The method of claim 14, further comprising:
receiving, from the base station, an indication to use one of the one or more channel state information omission configurations; and
determining to use the one of the one or more channel state information omission configurations based at least in part on the received indication.

16. The method of claim 15, further comprising:
receiving the indication via radio resource control signaling.

17. The method of claim 15, wherein the indication is based at least in part on the one or more channel state information reporting parameters.

18. The method of claim 14, further comprising:
identifying a configuration of a table associated with the one or more channel state information reporting parameters; and
determining to use one of the one or more channel state information omission configurations based at least in part on the configuration of the table.

19. The method of claim 14, further comprising:
identifying respective values of the one or more channel state information reporting parameters; and
determining to use one of the one or more channel state information omission configurations based at least in part on one or more of the respective values satisfying a threshold.

20. The method of claim 14, further comprising:
identifying that a number of coefficients for the channel state information report satisfies a threshold based at least in part on the one or more channel state information reporting parameters; and determining to use one of the one or more channel state information omission configurations based at least in part on the number of coefficients satisfying the threshold.

21. The method of claim 14, further comprising:
determining channel quality indicator information for the channel state information report based at least in part on precoding matrix indicator information;
refraining from updating the determined channel quality indicator information after omitting the portion of the channel state information report, wherein the omitted portion of the channel state information report comprises at least a portion of the precoding matrix indicator information; and
including the determined channel quality indicator information in the channel state information report.

22. The method of claim 14, wherein a second channel state information omission configuration of the one or more channel state information omission configurations corresponds to the channel state information report including the first portion of the NNZCs and a first bitmap corresponding to the first portion of the NNZCs and dropping the second portion of the NNZCs and a second bitmap corresponding to the second portion of the NNZCs.

23. The method of claim 22, wherein the first bitmap comprises a first number of bits that are based at least in part on a rank indicator, a set of NNZCs for each layer of one or more layers, and the first portion of the NNZCs, and wherein the second bitmap comprises a second number of bits corresponding to the second portion of the NNZCs.

24. The method of claim 22, wherein the first bitmap comprises a first number of bits that are based at least in part on a first portion of the spatial domain basis, a first portion of the frequency domain basis, a polarization metric, a first portion of the one or more layers, the strength metric, or any combination thereof, and wherein the second bitmap comprises a second number of bits that are based at least in part on a second portion of the spatial domain basis, a second portion of the frequency domain basis, the polarization metric, a second portion of the one or more layers, the strength metric, or any combination thereof.

25. The method of claim 14, wherein the channel state information report comprises a Type II channel state information report.

26. A method for wireless communication performed by a base station for wireless communication comprising:
configuring one or more channel state information reporting parameters for a channel state information report, the one or more channel state information reporting parameters comprising a number of frequency domain bases, a number of spatial domain bases, a number of non-zero coefficients (NNZCs), or any combination thereof;
transmitting, to a user equipment (UE), an indication to use one of one or more channel state information omission configurations for omitting a portion of the channel state information report, wherein a first channel state information omission configuration of the one or more channel state information omission configurations corresponds to the channel state information report including at least a first portion of the NNZCs and excluding at least a second portion of the NNZCs, wherein the first portion of the NNZCs and the second portion of the NNZCs are each based at least in part on a spatial domain basis, a frequency domain basis, one or more layers, a strength metric, or any combination thereof;
transmitting, to the UE, a trigger for the channel state information report that is based at least in part on the configured one or more channel state information reporting parameters; and
receiving, from the UE, the channel state information report that omits a portion of the channel state information report in accordance with the one of the one or more channel state information omission configurations based at least in part on the indication.

27. The method of claim 26, further comprising:
transmitting the indication via radio resource control signaling.

28. The method of claim 26, wherein a second channel state information omission configuration of the one or more channel state information omission configurations corresponds to the channel state information report including the first portion of the NNZCs and a first bitmap corresponding to the first portion of the NNZCs and dropping the second portion of the NNZCs and a second bitmap corresponding to the second portion of the NNZCs.

29. The method of claim 28, wherein the first bitmap comprises a first number of bits that are based at least in part on a rank indicator, a set of NNZCs for each layer of one or more layers, and the first portion of the NNZCs, and wherein the second bitmap comprises a second number of bits corresponding to the second portion of the NNZCs.

30. The method of claim 28, wherein the first bitmap comprises a first number of bits that are based at least in part on a first portion of the spatial domain basis, a first portion of the frequency domain basis, a polarization metric, a first portion of the one or more layers, the strength metric, or any combination thereof, and wherein the second bitmap comprises a second number of bits that are based at least in part on a second portion of the spatial domain basis, a second portion of the frequency domain basis, the polarization metric, a second portion of the one or more layers, the strength metric, or any combination thereof.

31. The method of claim 26, wherein the channel state information report comprises a Type II channel state information report.

* * * * *